United States Patent
Liu et al.

(10) Patent No.: US 10,636,402 B2
(45) Date of Patent: Apr. 28, 2020

(54) SYSTEMS AND METHODS FOR AUTOMATIC CALIBRATION OF MUSICAL DEVICES

(71) Applicant: SUNLAND INFORMATION TECHNOLOGY CO., LTD., Shanghai (CN)

(72) Inventors: Xiaolu Liu, Shanghai (CN); Zhengjun Yan, Shanghai (CN); Bin Yan, Shanghai (CN); Zhihong Deng, Shanghai (CN); Shaolin Yang, Shanghai (CN)

(73) Assignee: SUNLAND INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/102,820

(22) Filed: Aug. 14, 2018

(65) Prior Publication Data

US 2018/0366093 A1   Dec. 20, 2018

Related U.S. Application Data

(63) Continuation of application No. PCT/CN2017/072480, filed on Jan. 24, 2017, which
(Continued)

(30) Foreign Application Priority Data

Jan. 15, 2016 (CN) .......................... 2016 1 0027133
Jan. 15, 2016 (CN) .......................... 2016 1 0027147
(Continued)

(51) Int. Cl.
*G10H 1/44* (2006.01)
*G10H 1/00* (2006.01)
(Continued)

(52) U.S. Cl.
CPC ............... *G10H 1/44* (2013.01); *G01P 13/00* (2013.01); *G09B 15/00* (2013.01); *G10C 3/00* (2013.01);
(Continued)

(58) Field of Classification Search
CPC ............... G10H 1/44; G10H 2220/275; G10H 2220/201; G10H 2220/221;
(Continued)

(56) References Cited

U.S. PATENT DOCUMENTS 4,970,928 A   11/1990   Tamaki
5,324,883 A    6/1994   Kondo
(Continued)

FOREIGN PATENT DOCUMENTS

CN   2646826 Y   10/2004
CN   1624758 A    6/2005
(Continued)

OTHER PUBLICATIONS

International Search Report in PCT/CN2016/080224 dated Oct. 20, 2016, 5 pages.
(Continued)

*Primary Examiner* — Jeffrey Donels
(74) *Attorney, Agent, or Firm* — Metis IP LLC

(57) ABSTRACT

The present disclosure relates to a method and system for calibrating a musical device. In some embodiments, a method for calibrating a musical device includes: determining a first time corresponding to a first instruction that instructs a driving device to actuate a first component of a musical device using a first force; receiving first sensor data relating to motion information of the first component; determining a second time based on the first sensor data; determining, by a hardware processor, a first time deviation based on the first time and the second time; and calibrating the musical device based on the first time deviation.

18 Claims, 10 Drawing Sheets

Related U.S. Application Data is a continuation of application No. PCT/CN2017/000024, filed on Jan. 3, 2017, and a continuation of application No. PCT/CN2016/080224, filed on Apr. 26, 2016.

(30) Foreign Application Priority Data

| | | | |
|---|---|---|---|
| Jan. 15, 2016 | (CN) | ............................ | 2016 1 0027156 |
| Jan. 15, 2016 | (CN) | ............................ | 2016 1 0028648 |
| Jan. 15, 2016 | (CN) | ............................ | 2016 1 0028650 |
| Jan. 15, 2016 | (CN) | ............................ | 2016 1 0028718 |
| Jan. 28, 2016 | (CN) | ............................ | 2016 1 0059034 |
| Jan. 28, 2016 | (CN) | ....................... | 2016 2 0088254 U |
| Apr. 7, 2016 | (CN) | ............................ | 2016 1 0213505 |

(51) Int. Cl.

| | |
|---|---|
| G09B 15/00 | (2006.01) |
| G10C 3/00 | (2019.01) |
| G10H 1/34 | (2006.01) |
| G01P 13/00 | (2006.01) |
| G10C 3/20 | (2006.01) |
| G10F 1/02 | (2006.01) |
| G10C 3/12 | (2006.01) |

(52) U.S. Cl.
CPC ............... *G10C 3/12* (2013.01); *G10C 3/20* (2013.01); *G10F 1/02* (2013.01); *G10H 1/00* (2013.01); *G10H 1/0008* (2013.01); *G10H 1/0016* (2013.01); *G10H 1/344* (2013.01); *G10H 2220/015* (2013.01); *G10H 2220/091* (2013.01); *G10H 2220/201* (2013.01); *G10H 2220/221* (2013.01); *G10H 2220/275* (2013.01); *G10H 2220/305* (2013.01); *G10H 2230/011* (2013.01)

(58) Field of Classification Search
CPC ....... G10H 2220/091; G10H 2230/011; G10H 2220/305; G10H 2220/015; G10H 1/344; G10H 1/0008; G10H 1/0016; G10H 1/00; G10C 3/12; G10C 3/20; G10C 3/00; G01P 13/00; G10F 1/02; G09B 15/00
USPC ..................................................... 84/453, 745
See application file for complete search history.

(56) References Cited

U.S. PATENT DOCUMENTS

| | | | | |
|---|---|---|---|---|
| 5,880,393 | A * | 3/1999 | Kaneko ................... | G10G 3/04 84/21 |
| 7,435,895 | B2 * | 10/2008 | Muramatsu .............. | G10F 1/02 84/13 |
| 7,718,871 | B1 * | 5/2010 | Stahnke .................... | G10F 1/02 84/21 |
| 9,958,314 | B2 * | 5/2018 | Oba ......................... | G01H 3/00 |
| 2004/0206225 | A1 | 10/2004 | Wedel | |
| 2005/0139060 | A1 | 6/2005 | Muramatsu | |
| 2005/0145104 | A1 | 7/2005 | Sasaki | |
| 2005/0204908 | A1 | 9/2005 | Uehara | |
| 2005/0247182 | A1 | 11/2005 | Sasaki et al. | |
| 2006/0065103 | A1 * | 3/2006 | Sasaki ...................... | G10F 1/02 84/600 |
| 2006/0162534 | A1 * | 7/2006 | Muramatsu ........... | G01D 18/006 84/724 |
| 2007/0051792 | A1 | 3/2007 | Wheeler et al. | |
| 2007/0163426 | A1 | 7/2007 | Eitaki | |
| 2007/0214944 | A1 | 9/2007 | Sasaki et al. | |
| 2007/0221035 | A1 * | 9/2007 | Muramatsu .............. | G10F 1/02 84/13 |
| 2008/0092720 | A1 | 4/2008 | Yamashita et al. | |
| 2008/0178726 | A1 | 7/2008 | Honeywell | |
| 2008/0190261 | A1 | 8/2008 | Kenagy et al. | |
| 2009/0235810 | A1 | 9/2009 | Yaguchi | |
| 2010/0077905 | A1 | 4/2010 | Hammond | |
| 2010/0212477 | A1 | 8/2010 | Delong et al. | |
| 2014/0130652 | A1 | 5/2014 | Oba et al. | |
| 2014/0251114 | A1 | 9/2014 | Yoshikawa | |

FOREIGN PATENT DOCUMENTS

| | | |
|---|---|---|
| CN | 101118690 A | 2/2008 |
| CN | 101266516 A | 9/2008 |
| CN | 201111849 Y | 9/2008 |
| CN | 101452384 A | 6/2009 |
| CN | 101726024 A | 6/2010 |
| CN | 101916560 A | 12/2010 |
| CN | 102110434 A | 6/2011 |
| CN | 102262873 A | 11/2011 |
| CN | 202102617 U | 1/2012 |
| CN | 102479501 A | 5/2012 |
| CN | 102664000 A | 9/2012 |
| CN | 102722334 A | 10/2012 |
| CN | 103150940 A | 3/2013 |
| CN | 103093803 A | 5/2013 |
| CN | 202995737 U | 6/2013 |
| CN | 103247200 A | 8/2013 |
| CN | 103354092 B | 10/2013 |
| CN | 103472956 A | 12/2013 |
| CN | 103594105 A | 2/2014 |
| CN | 203422918 U | 2/2014 |
| CN | 203456074 U | 2/2014 |
| CN | 103778905 A | 5/2014 |
| CN | 103903602 A | 7/2014 |
| CN | 103903603 A | 7/2014 |
| CN | 103943094 A | 7/2014 |
| CN | 104078032 A | 10/2014 |
| CN | 104157276 A | 11/2014 |
| CN | 104200716 A | 12/2014 |
| CN | 204143369 U | 2/2015 |
| CN | 104658529 A | 5/2015 |
| CN | 104681017 A | 6/2015 |
| CN | 204390723 U | 6/2015 |
| CN | 104835485 A | 8/2015 |
| CN | 204596404 U | 8/2015 |
| CN | 104977904 A | 10/2015 |
| CN | 105702120 A | 6/2016 |
| CN | 205388737 U | 7/2016 |
| CN | 105895066 A | 8/2016 |
| CN | 106981223 A | 7/2017 |
| CN | 106981233 A | 7/2017 |
| CN | 106981278 A | 7/2017 |
| CN | 106981279 A | 7/2017 |
| CN | 106981282 A | 7/2017 |
| CN | 106981283 A | 7/2017 |
| CN | 107016983 A | 8/2017 |
| EP | 0507355 B1 | 1/1997 |
| EP | 2571007 A2 | 3/2013 |
| JP | H07244486 A | 9/1995 |
| JP | 2003255929 A | 9/2003 |
| JP | 2004258204 A | 9/2004 |
| JP | 2005092057 A | 4/2005 |
| JP | 2011211603 A | 10/2011 |
| JP | 2013037237 A | 2/2013 |
| JP | 2013160845 A | 8/2013 |
| KR | 20120094797 A | 8/2012 |
| KR | 101524279 B1 | 6/2015 |
| WO | 2009104933 A2 | 8/2009 |

OTHER PUBLICATIONS

Written Opinion in PCT/CN2016/080224 dated Oct. 20, 2016, 6 pages.
First Office Action in Chinese Application No. 201610213505.5 dated Dec. 28, 2017, 17 pages.
International Search Report in PCT/CN2017/000024 dated Apr. 12, 2017, 5 pages.
Written Opinion in PCT/CN2017/000024 dated Apr. 12 2017, 4 pages.

(56) References Cited

OTHER PUBLICATIONS

International Search Report in PCT/CN2017/072480 dated Apr. 27 2017, 5 pages.
Written Opinion in PCT/CN2017/072480 dated Apr. 27 2017, 4 pages.
First Office Action in Chinese Application No. 201610027133.7 dated Mar. 15, 2019, 19 pages.
First Office Action in Chinese Application No. 201610027147.9 dated Mar. 11, 2019, 14 pages.
First Office Action in Chinese Application No. 201610027156.8 dated Mar. 14, 2019, 16 pages.
First Office Action in Chinese Application No. 201610028718.0 dated Mar. 5, 2019, 16 pages.
First Office Action in Chinese Application No. 201610059034.7 dated Mar. 11, 2019, 16 pages.
The Second Office Action in Chinese Application No. 201610213505.5 dated Feb. 19, 2019, 18 pages.

\* cited by examiner

SYSTEMS AND METHODS FOR AUTOMATIC CALIBRATION OF MUSICAL DEVICES

CROSS-REFERENCE TO RELATED APPLICATIONS

This application is a Continuation of International application NO. PCT/CN2017/072480, filed on Jan. 24, 2017, which claims priority of International Application No. PCT/CN2017/000024 filed on Jan. 3, 2017, and International Application No. PCT/CN2016/080224 filed on Apr. 26, 2016, which claims priority of Chinese Application No. 201610028648.9 filed on Jan. 15, 2016, Chinese Patent Application No. 201610028650.6 filed on Jan. 15, 2016, Chinese Patent Application No. 201610027133.7 filed on Jan. 15, 2016, Chinese Patent Application No. 201610027147.9 filed on Jan. 15, 2016, Chinese Patent Application No. 201610027156.8 filed on Jan. 15, 2016, Chinese Patent Application No. 201610028718.0 filed on Jan. 15, 2016, Chinese Patent Application No. 201610059034.7 filed on Jan. 28, 2016, Chinese Patent Application No. 201620088254.8 filed on Jan. 28, 2016, and Chinese Patent Application No. 201610213505.5 filed on Apr. 7, 2016, the entire content of each of which are incorporated herein by reference.

TECHNICAL FIELD

This application relates to methods and systems for calibrating musical devices, and more particularly, to methods and systems for automatic calibration of musical devices (e.g., a piano system).

BACKGROUND

A musical instrument, such as a piano, can contain a mechanism (e.g., a pneumatic or electro-mechanical) for automatically performing music. The musical instrument can also include solenoid actuators that use electric current to drive mechanical assemblies of the musical instrument (e.g., key actions of a piano). When a solenoid actuator is instructed to produce a musical tone (e.g., triggered by a Musical Instrument Digital Interface (MIDI) file), the solenoid actuator can produce electromagnetic fields to control the pneumatic or electro-mechanical mechanism to strike on a string of the musical instrument and generate the musical tone. However, there may be a time delay between the instruction and the generation of the musical tone. An audience or player may regard such time delay as an unacceptable latency. Accordingly, it is desirable to provide methods and systems for automatic calibration of the musical device to reduce and/or eliminate such latency.

SUMMARY

In one aspect of the present disclosure, a method of calibrating a musical device is provided. The method can include: determining a first time corresponding to a first instruction that instructs a driving device to actuate a first component of a musical device using a first force; receiving first sensor data relating to motion information of the first component; determining a second time based on the first sensor data; determining, by a hardware processor, a first time deviation based on the first time and the second time; and calibrating the musical device based on the first time deviation.

In some embodiments, calibrating the musical device based on the first time deviation may include associating the first time deviation with the first force and the first component.

In some embodiments, determining the first time deviation based on the first time and the second time may include determining a difference between the first time and the second time.

In some embodiments, determining the first time deviation based on the first time and the second time may further include updating mapping information related to a plurality of intensity levels and a plurality of time deviations.

In some embodiments, the second time may include a time instant corresponding to an operation of the first component of the musical device.

In some embodiments, the method may further include: receiving a performance instruction corresponding to the musical device; identifying the first component based on the performance instruction; determining the first force corresponding to the first component based on the performance instruction; acquiring the first time deviation associated with the first force; and generating an action instruction to the first component based on the first time deviation.

In some embodiments, the method may further include: identifying a second force to be applied to the first component of the musical device; sending a second instruction to actuate the first component of the musical device using the second force; determining a second time deviation based on the second instruction; and calibrating the musical device based on the second time deviation.

In some embodiments, the method may further include: identifying a second component of the musical device to be calibrated; sending a third instruction to actuate the second component of the musical device using the first force; determining a third time deviation based on the third instruction; and calibrating the musical device based on the third time deviation.

In some embodiments, the first sensor data may be generated by a sensor that is configured to detect motion information related to the first component of the musical device.

In another aspect of the present disclosure, a system is provided. The system can include a processor and a memory storing a set of instructions for calibrating a musical device. When executing the set of instructions, the processor can be directed to: determine a first time corresponding to a first instruction that instructs a driving device to actuate a first component of a musical device using a first force; receive first sensor data relating to motion information of the first component; determine a second time based on the first sensor data; determine a first time deviation based on the first time and the second time; and calibrate the musical device based on the first time deviation.

In a further aspect of the present disclosure, a non-transitory machine-readable storage medium is provided. The non-transitory machine-readable storage medium including instructions that, when accessed by a processing device, can cause the processing device to: determine a first time corresponding to a first instruction that instructs a driving device to actuate a first component of a musical device using a first force; receive first sensor data relating to motion information of the first component; determine a second time based on the first sensor data; determine a first time deviation based on the first time and the second time; and calibrate the musical device based on the first time deviation.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are one method to distinguish different components, elements, parts, section or assembly of different level in ascending order. However, the terms may be displaced by another expression if they may achieve the same purpose.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provides for a smart musical system that can be coupled with a musical instrument with one or more keyboards (e.g., a piano). In some embodiments, the smart piano system and/or one or more portions of the smart piano system may be integrated with the musical instrument. In some embodiments, the smart piano system and/or one or more portions of the smart piano system may be implemented as stand-alone devices.

Figure 1:
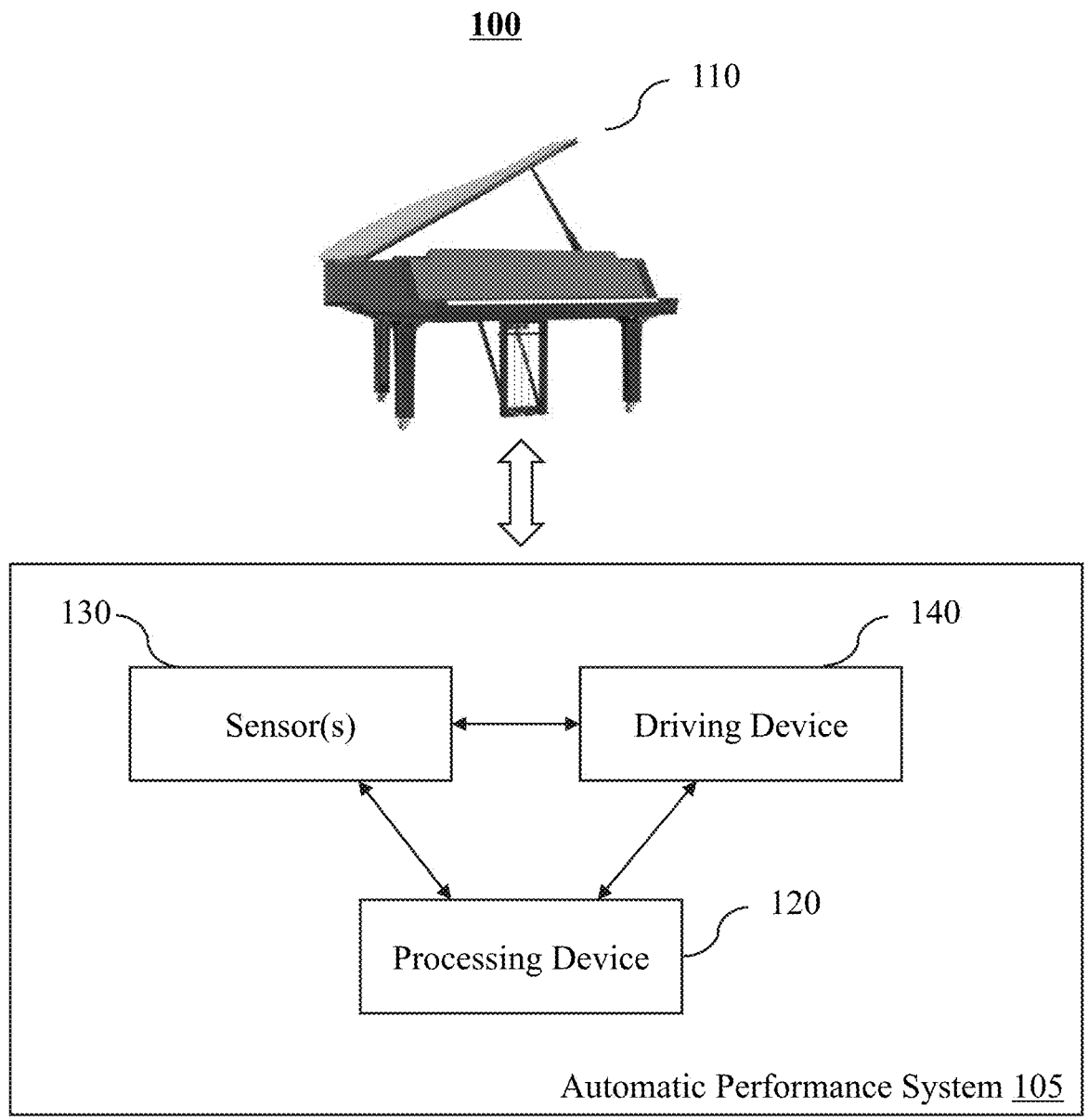
FIG. 1 is a block diagram illustrating a smart musical system according to some embodiments of the present disclosure.

FIG. 1 is a block diagram illustrating a smart musical system according to some embodiments of the present disclosure. It should be noted that the smart musical system 100 described below is merely provided for illustrative purposes, and not intended to limit the scope of the present disclosure.

As shown in FIG. 1, the smart musical system 100 may include an automatic performance system 105 and a musical device 110. The musical device 110 may include one or more components. The one or more components of the musical device 110 may be, for example, a key of a piano, a group of keys of the piano, etc. In some embodiments, multiple components of the musical device may be divided into one or more groups. For example, the keys of a piano may be divided into one or more groups based on actions' lengths of the piano. An action of a musical device (e.g., a key action of a piano) can include a mechanical assembly associated with operations of one or more components of the musical device. For example, a key action can include a mechanical assembly associated with depression of a key transferred into rapid motion of one or more hammers, which creates sound by striking the key. In some embodiments, 88 keys of an upright piano may be divided into five groups or any other number of groups based on the lengths of the key actions of the upright piano. As another example, 128 keys of a grand piano may be divided into seven groups or any other number of groups based on the lengths of the key actions of the grand piano.

As another example, one or more keys of a piano may be determined as three groups. The three groups may include a lower-pitch key group, a middle-pitch key group and a higher-pitch key group. In some embodiments, the component groups may be determined by a scale of eight notes (or referred to as an octave). For example, keys of a piano may be determined as seven key groups by the scale of eight notes. Each key group may include twelve keys.

The musical device 110 may include one or more keyboard musical instruments. As referred to herein, a keyboard musical instrument may be and/or include any musical instrument with a keyboard. Exemplary keyboard musical instrument may include a piano (e.g., an acoustic piano), an organ (e.g., a pipe organ, a Hammond organ, etc.), an accordion, an electronic keyboard, a synthesizer, a musical instrument digital interface (MIDI) keyboard, or the like, or a combination thereof. In some embodiments, the musical device may include one or more portions of a keyboard musical instrument. A portion of a key-based musical instrument may be and/or include, for example, a key of a piano (e.g., a white key or a black key), a hammer, a pedal, a protective case, a soundboard, a metal string, or the like, or a combination thereof.

The musical device 110 may be an acoustic piano, an electric piano, an electronic piano, a digital piano, and/or any other musical instrument with a keyboard. A non-exclusive list of an acoustic piano that may be used in connection with some embodiments of the present disclosure may include a grand piano, an upright piano, a square piano, a specialized piano (such as a toy piano, a mini piano, a prepared piano, etc.), etc. The automatic performance system 105 may further include a processing device 120, one or more sensors 130 and a driving device 140. More or fewer components may be included in the smart musical system 100 and/or the automatic performance system 105 without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.). In some embodiments, one or more portions of the automatic performance system 105 (e.g., the processing device 120, the sensor(s) 130 or the driving device 140) and/or the automatic performance system 105 may be integrated with the musical device 110.

The processing device 120 may be configured to process information and/or signals provided by the sensor(s) 130, the driving device 140 and/or any other device. In some embodiments, the processing device 120 may analyze motion information detected by the sensor(s) 130. For example, the processing device 120 may analyze forces of one or more components of a musical device. In some embodiments, the processing device 120 may calibrate the driving device 140 and/or the sensor(s) 130. For example, the processing device 120 may calibrate one or more keys and/or pedals based on one or more sensor data and/or forces (e.g., forces corresponding to different intensity levels and/or intensity level groups) applied to the key or pedal by the driving device 140. In some embodiments, the calibration may be performed by executing one or more processes 400-700 of FIGS. 4-7 and/or one or more portions of these processes.

The processing device 120 may further be configured to calibrate one or more components of the musical device 110. For example, the components of the musical device 110 may be calibrated individually, in groups, and/or in any other manner. As another example, the components of the musical device 110 may be calibrated sequentially, in parallel, and/or in any other manner. In some embodiments, the processing device 120 may calibrate the component(s) of the musical device 110 by determining one or more relationships among time deviations and forces. In some embodiment, the time deviations may correspond to the forces respectively. For example, a force applied to the component and/or the driving device may associate with one or more time deviations. As another example, the force applied to the component group and/or the driving device group may associate with one or more time deviations. In some embodiments, the force applied to the components may be based on the component groups. The time deviation may represent a difference between a desired time of actuation of the component and an actual time of actuation of the driving device 140 and/or operation of the component (e.g., depression of a key). In some embodiments, the time deviation may correspond to a time duration that the driving device 140 has been used.

The one or more relationships may be represented using one or more lookup tables, functions, coordinate graphs, and/or any other data structure that can be used to map the forces to one or more time deviations. For example, the processing device 120 may determine one or more intensity levels and/or intensity level groups corresponding to the forces and the time deviations. The intensity levels and/or the intensity level groups corresponding to the forces may be applied to one or more components. In some embodiments, a component may correspond to one or more forces. For example, a key of a piano may correspond to one or more intensity levels and/or intensity level groups. As another example, a group of keys of a piano may correspond to one or more intensity levels and/or intensity level groups. The forces may be used to drive the driving device 140. The driving device 140 may include one or more actions (e.g., key actions) of certain lengths. Multiple actions may or may not have the same length. More particularly, for example, the length of the leftmost key action of a piano may be different from the length of the rightmost key action of the piano. In some embodiments, the length of an action may correspond to a distance that the action moves to strike component key. In some embodiments, the time deviations corresponding to different components with the same intensity level may be different. For example, the time deviations of the left keys may be greater than the time deviations of the right keys.

In some embodiments, the driving device 140 corresponding the component may be actuated when an instruction generated and/or sent to the driving device 140. In some embodiments, the component may be actuated when the sensor data received including motion information of the corresponding component being pressed. The processing device 120 may associate the intensity levels and the time deviations. In some embodiments, the processing device 120 may generate one or more lookup tables and/or any other data structure to store the associations. Alternatively or additionally, the processing device 120 may update one or more lookup tables including predetermined mapping information related to the intensity levels, the forces, and the time deviations.

In some embodiments, the processing device 120 may include one or more processor-based and/or microprocessor-based units. Merely by way of example, the processor (e.g., a hardware processor) may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an acorn reduced instruction set computing (RISC) machine (ARM), a programmable logic device (PLD), any other circuit and/or processor capable of executing the functions described herein, the like, or any combination thereof.

The sensor(s) 130 may be configured to detect motion information relating to the musical device 110. The motion information may include a sequence of keys and/or pedals that may be pressed according to a musical score, a motion state of a key or a pedal (e.g., a position of the key/pedal, a velocity of the key/pedal, an acceleration of the key/pedal, or the like), timing information relating to the motion state of the key/pedal (e.g., a time instant corresponding to the motion state of the key/pedal), or the like, or a combination thereof. In some embodiments, actuating a key/pedal may include pressing a key/pedal, releasing a key/pedal, striking a key/pedal, or the like, or a combination thereof. In some embodiments, the sensor(s) 130 may generate sensor data based on the motion information of the key/pedal. The sensor data may be an electric signal, such as a current signal, a voltage signal, etc. The current signal may be a direct current signal or an alternating current signal. In some embodiments, the value of the sensor data may represent the motion information of the corresponding key or the pedal being pressed or released. In some embodiments, the value of the sensor data may represent a volume of a sound generated by the corresponding key or pedal. For example, the automatic performance system 105 may include one or more volume analyzers (not shown in FIG. 1) for analyzing volumes of sounds generated by the smart musical system 100. Each of the volume analyzers may correspond to a key or a pedal. In some embodiments, the volume of sound greater than a threshold may represent that the key or the pedal has reached a particular position (e.g., whether the component has been pressed).

In some embodiments, the sensor(s) 130 may include an optoelectronic sensor, a conductive rubber (or silicone rubber) sensor, an accelerometer, a magneto-electric sensor, a piezo-electric sensor, an angle sensor, or the like, or any combination thereof. The optoelectronic sensor may emit a light used for acquiring an optoelectronic signal. The light may include a visible light and an invisible radiation including, a gamma ray, an X-ray, ultraviolet, an infrared, or the like, or a combination thereof. The conductive rubber sensor may conduct electricity with the amount of pressure. The magneto-electric sensor may be a Hall sensor. The piezo-electric sensor may use piezoelectric effect to measure changes in pressure, acceleration, velocity, temperature, strain, force, or the like, by converting them to an electrical charge.

In some embodiments, the sensor(s) 130 may include a key sensor and a pedal sensor. In some embodiments, the automatic performance system 105 may include multiple key sensors and/or pedal sensors. Each key sensor may correspond to a key, and each pedal sensor may correspond to a pedal. Merely by way of example, the key sensor may generate an electric signal representative of a motion state of a corresponding key. In some embodiments, the key sensor and/or the pedal sensor may be coupled to the key and/or the pedal. For example, the key sensor and/or the pedal sensor may be installed above or below the key and/or the pedal. In some embodiments, the sensor(s) 130 may generate sensor data indicative of press of a key and/or pedal based on motion information of the key and/or pedal. For example, the sensor(s) 130 may generate the sensor data in response to detecting motion information corresponding to depression of the key and/or pedal (e.g., a value of sensor data that are greater than a reference value). As another example, the sensor(s) 130 may generate the sensor data representing motion information of the key and/or pedal. The sensor data can include any suitable data that can be used to indicate depression of the key and/or pedal, such as a Boolean value (e.g., "True," "False," etc.), a binary value (e.g., "0," "1," etc.), one or more numbers, one or more portions of sensor data (e.g., sensor data 320 of FIG. 3D), and/or any other suitable data.

The driving device 140 may be configured to actuate one or more components of the musical device 110. The component(s) of the musical device 110 may be actuated by the driving device 140 respectively. For example, a first driving device may correspond to a first key and/or a first key group of a piano. In some embodiments, the driving device 140 may strike the keys and/or operate the pedals according to an instruction. As used herein, an instruction may refer to any information relating to a piece of music (e.g., a piano piece). The instruction may include a musical sheet, a musical score, an annotation, a musical note, a title of the music score, an operation sequence of keys and/or pedals, an endurance, a strength of a force applied to a key or a pedal, time to apply the strength, or the like, or a combination thereof. For example, when the driving device 140 receives an instruction of applying a force with a specific strength to a key, the driving device 140 may apply the force to the key based on the instruction. In some embodiments, the driving device 140 may receive the instruction from the processing device 120, a MIDI file, a user, or any other device. In some embodiments, the MIDI file may include a musical sheet, a musical score, an annotation, a musical note, a title of the music score, an operation sequence of component(s), an endurance, a strength of a force applied to a component, or the like, or a combination thereof. In some embodiments, the driving device 140 may be actuated based on sensor data from the sensor(s) 130.

In some embodiments, the driving device 140 may include one or more key actuators (not shown in FIG. 1), pedal actuators (not shown in FIG. 1), and solenoids (not shown in FIG. 1). Each key actuator may correspond to one or more keys. Each pedal actuator may correspond to one or more pedals. In some embodiments, one or more of the key actuators and/or the pedal actuators may be operated by the solenoids. In some embodiments, a key actuator and/or a pedal actuator may be coupled to its corresponding keys and/or pedals. For example, the key actuator and/or the pedal actuator may be installed above or below the keys and/or the pedals.

In some embodiments, the driving device 140 may actuate one or more keys, pedals and/or any other component of the musical device with controlled forces. For example, the driving device 140 can apply forces to one or more keys and/or pedals of the piano corresponding to one or more intensity levels. As used herein, an intensity level may correspond to an amount of force applied to a component of a musical device (e.g., a key, a pedal, etc.) and/or an amount of force used to actuate the component by the driving device 140. For example, an intensity level can correspond to 5 newtons, 5.4 newtons, 10 newtons, etc. In some embodiments, a higher intensity level may correspond to a greater force while a lower intensity level may correspond to a less force. Alternatively, a lower intensity level may correspond to a greater force while a higher intensity level may correspond to a less force. In some embodiments, an intensity level may be represented by one or more numbers, letters, symbols, characters, and/or any other value. For example, multiple intensity levels may be referred to as intensity level 0, intensity level 1, intensity level 2, etc. As another example, multiple intensity levels may be referred to as intensity level A, intensity level B, etc. Multiple intensity levels may correspond to multiple forces. Two intensity levels may or may not correspond to the same amount of force.

In some embodiments, a component of the musical system may be actuated using forces corresponding to multiple intensity levels. The intensity levels may fall within an interval defined by a lower limit and an upper limit. The lower limit and the upper level may correspond to a minimum intensity level and a maximum intensity level, respectively. As used herein, a minimum intensity level may refer to a lower limit of multiple intensity levels. For example, intensity level 0 may be regarded as being the minimum intensity level of intensity level 0, intensity level 1, . . . , and intensity level n, where n is a positive integer. In some embodiments, the minimum intensity level may correspond to an amount of force that may be used to move a component of the musical system (e.g., pressing a key). In some embodiments, the minimum intensity level may correspond to a minimum force required to move the component. As referred to herein, a maximum intensity level may refer to an upper limit of multiple intensity levels. For example, intensity level n may be regarded as being the maximum intensity level of intensity level 0, intensity level 1, . . . , and intensity level n, where n is a positive integer.

In some embodiments, an intensity level of a force applied to the key or the pedal may be represented by a control signal (e.g., an excitation current of a coil) that can be used to drive the driving device 140. For example, a value of the control signal (e.g., an amplitude) may indicate a value of an intensity level. More particularly, for example, a greater value of the control signal may correspond to a higher intensity level. In some embodiments, the driving signal may be a pulse-width modulation signal, a direct current signal, etc.

In some embodiments, the smart musical system 100 may be further connected with one or more external devices (e.g., an external data source). In some embodiments, the connection between the smart musical system 100 and the external device(s) may include a wired connection or a wireless connection. The wired connection may include a cable, an optical fiber, electric wire, or the like, or a combination thereof. The wireless connection may include a Wi-Fi connection, a Bluetooth connection, an infrared (IR) connection, a radar, or the like, or a combination thereof. In some embodiments, the external device(s) may include a smart phone, a laptop computer, a tablet processing device, a wearable processing device, a personal computer, a server, or the like, or a combination thereof.

It should be noted that the description of the musical system is provided for the purposes of illustration, and not intended to limit the scope of the present disclosure. For persons having ordinary skills in the art, various variations and modifications may be conducted under the teaching of the present disclosure. However, those variations and modifications may not depart from the protecting of the present disclosure. For example, the automatic performance system 105 may include a storage device. Alternatively or additionally, the components in the automatic performance system 105 may include a storage device respectively. As a further example, the components in the smart musical system 100 may be independent, or any part of the components may be integrated into one component to work integrally.

Figure 2:
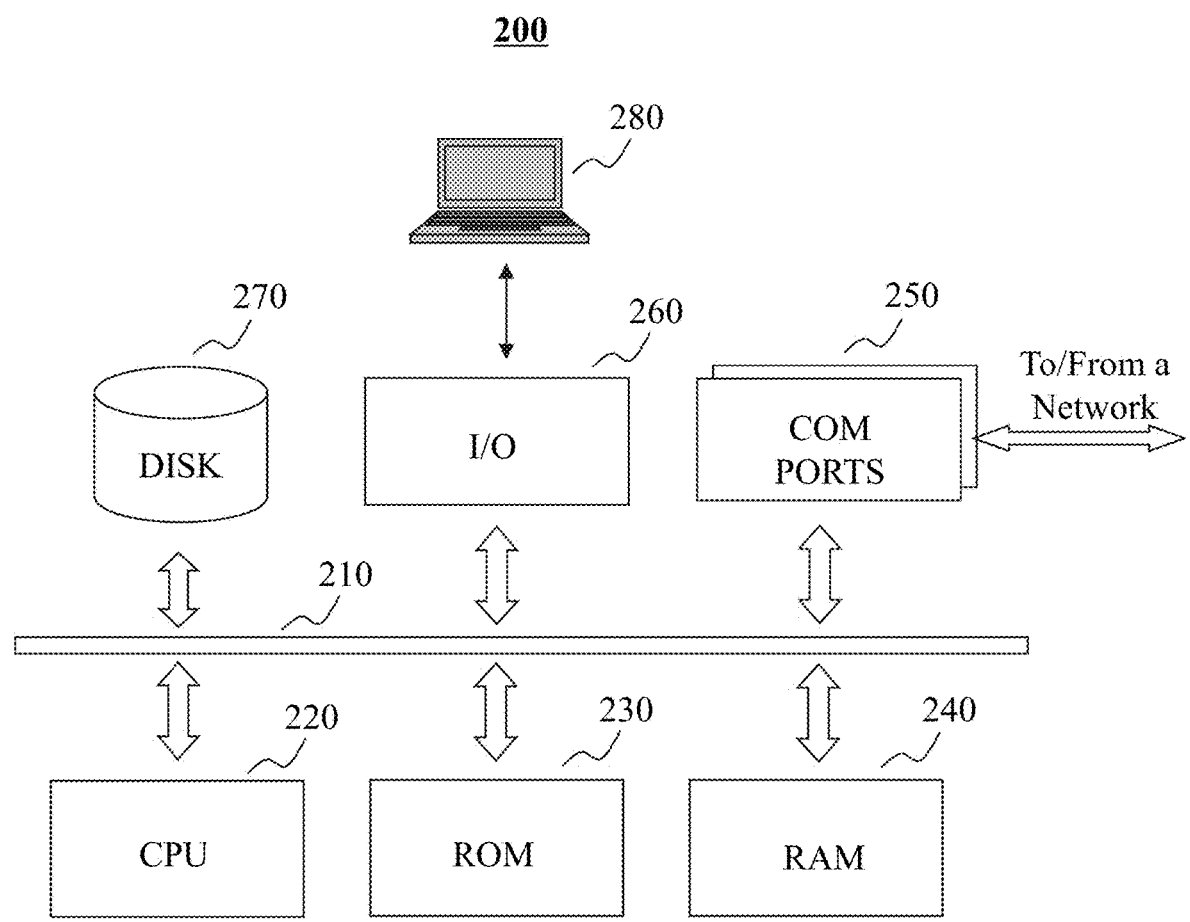
FIG. 2 is a functional block diagram illustrating an example of a computer that can be used to implement the present teaching according to some embodiments of the present disclosure.

FIG. 2 is a functional block diagram illustrating an example 200 of a computer that can be used to implement various embodiments of the present disclosure. Computer 200 may be a general-purpose computer and/or a special purpose computer. Both can be used to implement a specialized system for the present teaching. Computer 200 may be used to implement any component of the automatic performance system as described herein. For example, the processing device 120, etc., may be implemented on a computer such as computer 200, via its hardware, software program, firmware, or a combination thereof. Although only one such computer is shown, for convenience, the computer functions relating to the management of the supply of service as described herein may be implemented in a distributed fashion on a number of similar platforms, to distribute the processing load.

Computer 200, for example, includes COM ports 250 connected to and from a network connected thereto to facilitate data communications. Computer 200 also includes a central processing unit (CPU) 220, in the form of one or more processors, for executing program instructions. The exemplary computer platform includes an internal communication bus 210, program storage and data storage of different forms, e.g., disk 270, read only memory (ROM) 230, or random access memory (RAM) 240, for various data files to be processed and/or communicated by the computer, as well as program instructions to be executed by the CPU. Computer 200 also includes an I/O component 260, supporting input/output flows between the computer and other components therein such as user interface elements 280. Computer 200 may also receive programming and data via network communications.

To implement various modules, units, and their functionalities described in the present disclosure, computer hardware platforms may be used as the hardware platform(s) for one or more of the elements described herein (e.g., the automatic performance system 105, and/or other components of the smart musical system 100 described in the present disclosure. The hardware elements, operating systems and programming languages of such computers are conventional in nature, and it is presumed that those skilled in the art are adequately familiar therewith to adapt those technologies to the management of the supply of service as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 3A:
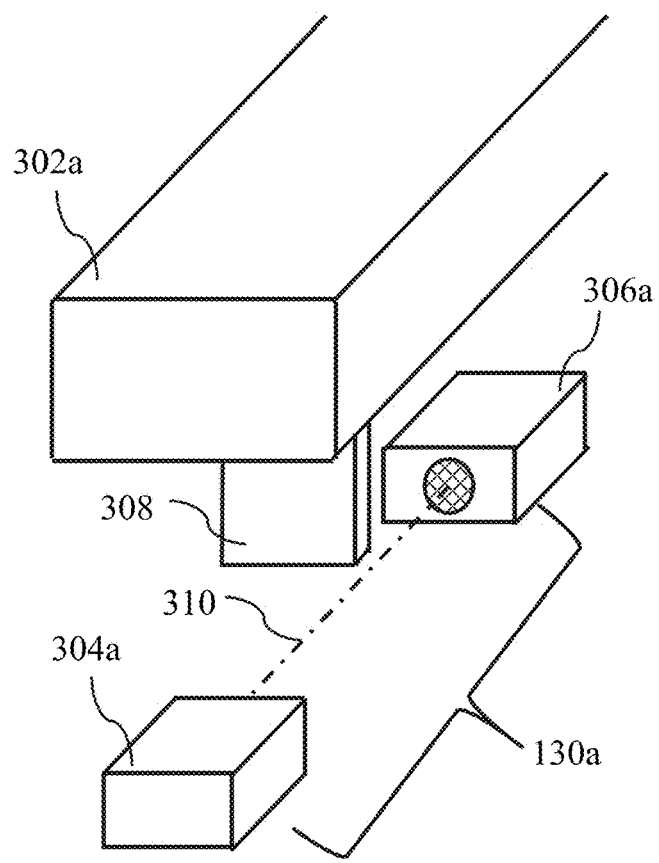
FIGS. 3A-3C are diagrams illustrating mechanisms for generating sensor data using exemplary sensors according to some embodiments of the present disclosure.
Figure 3B:
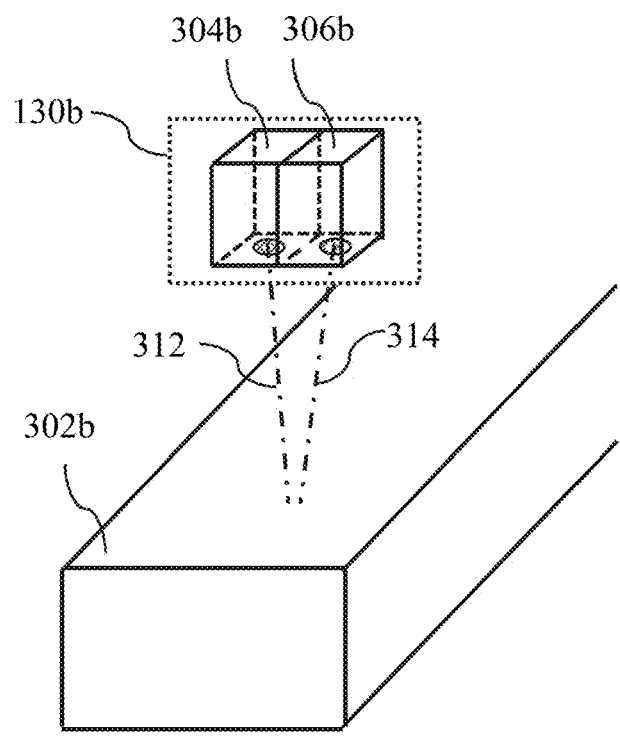
Figure 3C:
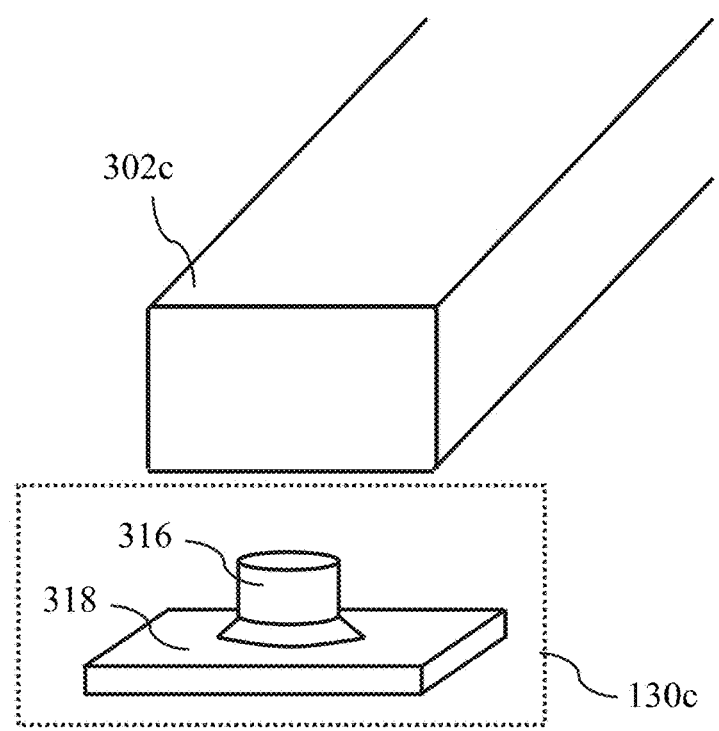

FIGS. 3A-3C are diagrams illustrating mechanisms for generating sensor data using exemplary sensors 130a, 130b and 130c according to some embodiments of the present disclosure. In some embodiments, each of sensors 130a, 130b, and 130c may include an optoelectronic sensor and/or a conductive rubber (or silicone rubber) sensor. As illustrated in FIG. 3A, a sensor 130a may include a light-emitting element 304a and a light-detecting element 306a. An exemplary light-emitting element 304a may include a visible LED, a laser LED, an infrared LED, a laser diode (LD), a photocell, or the like, or a combination thereof. An exemplary light-detecting element 306a may include a phototube, an active-pixel sensor (APS), a bolometer, a charge-coupled device (CCD), a gaseous ionization detector, a photoresistor, a phototransistor, or the like, or a combination thereof. The light-emitting element 304a may generate light of various wavelengths. For example, the light-emitting element 304a may generate visible light, infrared light, ultraviolet (UV) light, etc. In some embodiments, the wavelength of a beam of light emitted by the light-emitting element 304a may be controlled by one or more motors using a Pulse Width Modulation (PWM) mechanism. The light-detecting element 306a may be configured to receive the light and to convert it into an electric signal (e.g., a current signal, a voltage signal, etc.).

In some embodiments, the light-emitting element 304a and the light-detecting element 306a may be positioned under a component 302a. In some embodiments, a non-transparent plate 308 may be coupled to the component 302a. The non-transparent plate 308 may partially or completely prevent the light-detecting element 306a from receiving the light emitted by the light-emitting element 304a. The non-transparent plate 308 may be coupled to a surface of the component 302a (e.g., the bottom of the component 302a). In some embodiments, the light-emitting element 304a may constantly emit light towards the light-detecting element 306a. The light-emitting element 304a may discontinuously emit light towards the light-detecting element 306a. For instance, there may be one or more time intervals between two light emissions. The one or more time intervals may be determined based on the velocity of the components being actuated.

In some embodiments, a light beam 310 may be emitted by the light-emitting element 304a. When the component 302a is not pressed down, the component may stay at a "top" position. When the component 302a is pressed down, the component may move downwards from the "top" position. When the component 302a does not go further, it reaches an "end" position. The non-transparent plate 308 may move along with the component 302a and may block one or more portions of the light beam 304a. The amount of the light detected by the light-detecting element 306a may vary due to the movement of the non-transparent plate 308. For example, when the component 302a moves toward the "end" position, the amount of light detected by the light-detecting element 306a may decrease. As another example, when the component 302a moves toward the "top" position, the amount of light detected by the light-detecting element 306a may increase. The light-detecting element 306a may determine the amount of the received light over time and may convert such information into one or more electric data (e.g., one or more sensor data).

Referring to FIG. 3B, in some embodiments, the non-transparent plate 308 may be omitted. A sensor 130b may include a light-emitting element 304b and a light-detecting element 306b. For instance, the light-emitting element 304b and the light-detecting element 306b may be placed above or beneath a component 302b. A light beam 312 emitted by the light-emitting element 304b may be projected towards the component 302b. The light beam 312 may be reflected by the component 302b once it reaches a surface of the component 302b (e.g., the upper surface, the bottom surface, etc.). The reflected light 314 may then travel towards the light-detecting element 306b and may be received by the light-detecting element 306b. When the component 302b is pressed down, the component may move downwards from the "top" position to the "end" position. The distance that the light travels from the light-emitting element 304b to the light-detecting element 306b may vary due to various motion states of the component. The light-detecting element 306b may determine the time between light emission and light reception to record the change in distance that the light travels. The change in distance may be converted into one or more electric signals by the light-detecting element 306b. Thus, the motions of the component may be detected by the sensor(s) 130b.

As illustrated in FIG. 3C, a sensor 130c may include a conductive element 316 and a circuit board 318. An exemplary conductive element 316 may include conductive elastomer, conductive plastic polymer, conductive rubber, conductive silicone rubber, metal rubber (e.g. conductive plastic polymers with metal ions, etc.), or the like, or a combination thereof. An exemplary circuit board 318 may include printed circuit board (PCB), flexible printed circuit board (FPC or FPCB), or the like, or a combination thereof. The sensor(s) 130c may be positioned under a component 302c. The conductive element 316 may be contacted to the component 302c. The circuit board 318 may be electrically conductive when the conductive element 316 moved down. In some embodiments, the conductive element 316 may move along with the component 302c and reach the circuit board 318. The change in conductivity of the circuit board 318 may indicate the motions of component 302c. The motions of the component may be recorded by the sensor(s) 130c.

It should be noted that mechanisms for detecting motions of a component of a piano using a sensor described herein is not exhaustive and not limiting. Numerous other changes, substitutions, variations, alterations and modifications may be ascertained to one skilled in the art, and it is intended that the present disclosure encompasses all such changes, substitutions, variations, alterations, and modifications as falling within the scope of the present disclosure. In some embodiments, the sensors 130a, 130b, and 130c may be placed in different positions. In some embodiments, the sensors 130a, 130b, and/or 130c may or may not be attached to a component. In some embodiments, the sensors 130a, 130b, and/or 130c may be placed in proximity to a component.

Figure 3D:
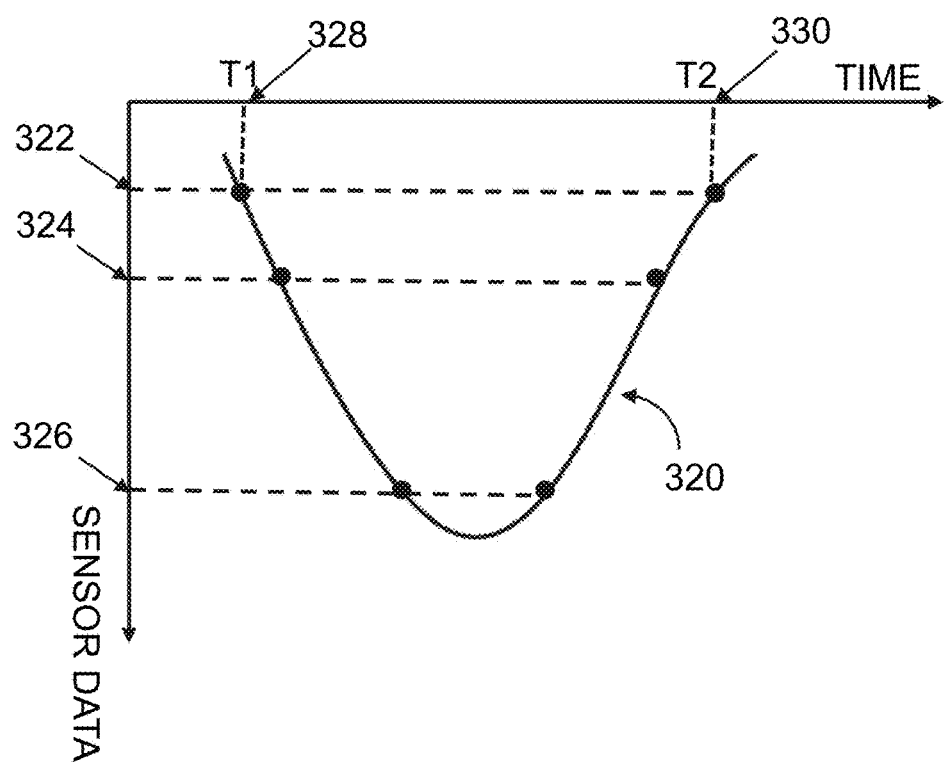
FIG. 3D is a schematic diagram illustrating an example of sensor data according to some embodiments of the present disclosure.

FIG. 3D is a schematic diagram illustrating an example of sensor data 320 according to some embodiments of the present disclosure. Sensor data 320 can correspond to a trajectory of one or more component of a musical device during a performance of a piece of music. The component of the musical device may include one or more keys and/or pedals. Sensor data 320 may be generated using one or more mechanisms described in conjunction with FIGS. 3A-3C above. The component may stay at a "top" position if no force is exerted on the component. When the component is pressed, the component may move downwards along with a finger of the player (or a component actuator). When the component does not go further (e.g., when the player or the actuator starts releasing the component), the component may reach an "end" position. After the component is released by the player, the component moves upwards to the "top" position. As such, the trajectory of the component may represent the component's movements from the "top" position to the "end" position and/or movements from the "end" position to the "top" position.

Sensor data 320 may represent information about the motion of the component in the trajectory. For example, a value of the sensor data (e.g., an amplitude of the sensor data) may correspond to a particular position of the component (e.g., the "top" position, the "end" position, a position between the "top" position and the "end" position, and/or any other position). A time instant corresponding to the value of the sensor data may indicate a time at which the component is located at the particular position. Various values of the sensor data may correspond to different positions of the component in the trajectory. During the movement of the component from the "top" position to the "end"

position, the values of the sensor data may increase. Similarly, during the movement of the component from the "end" position to the "top" position, the values of the sensor data may decrease.

In some embodiments, one or more reference values may be used to determine positions of the component during a performance. For example, as illustrated in FIG. 3D, reference values 322, 324, and 326 can correspond to a first position, a second position, and a third position of the component, respectively. In some embodiments, the first position may correspond to the "top" position. The third position may correspond to the "end" position. The third position may correspond to a position between the "top" position and the "end" position. Timing information related to the reference values 322, 324, and 326 (e.g., time instants 328 and 330 corresponding to reference value 322) may be used to determine motion information related to the component. For example, time instant 328 may correspond to depression of the component. Time instant 330 may correspond to the release of the component. A time interval between time instant 328 and time instant 330 may represent a note duration produced by the component. In some embodiments, when a value of the sensor data is greater than or equal to reference value 322, the component may be regarded as having been pressed. The reference values 322, 324, and 326 can be determined based on user input, empirical results, and/or any other information.

While three reference values are illustrated in FIG. 3D, this is merely illustrative. Any suitable number of reference values can be used to determine motion information of the component. For example, four reference numbers corresponding to four positions may be used in some embodiments.

Figure 3E:
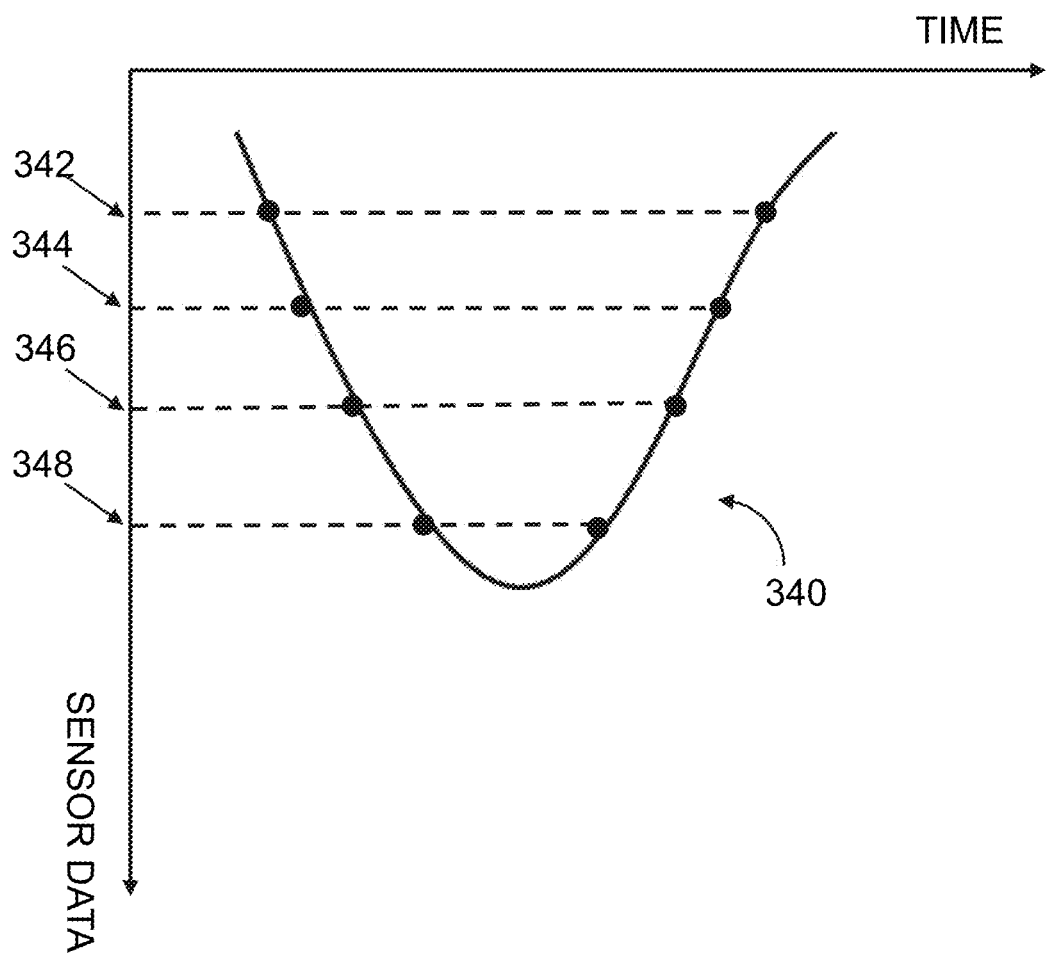
FIG. 3E is a schematic diagram illustrating another example of sensor data according to some embodiments of the present disclosure.

FIG. 3E is a schematic diagram illustrating another example of sensor data 340 according to some embodiments of the present disclosure. Sensor data 340 can correspond to a trajectory of a key of a piano during a performance of a piece of music. Sensor data 340 may be generated using one or more mechanisms described in conjunction with FIGS. 3A-3C above.

In some embodiments, the smart musical system 100 may set four thresholds in the whole trajectory. For example, as illustrated in FIG. 3E, threshold 342, 344, 346, and 348 may correspond to a first threshold, a second threshold, a third threshold, and a fourth threshold of the key, respectively. In some embodiments, the first threshold may be named "TOP_UP." The second threshold may be named "TOP." The third threshold may be named "MID." The fourth threshold may be named "TAIL." The four thresholds substantially divide the whole trajectory into five sections. These sections may or may not be evenly distributed along the axis corresponding to the sensor data 340.

Figure 3F:
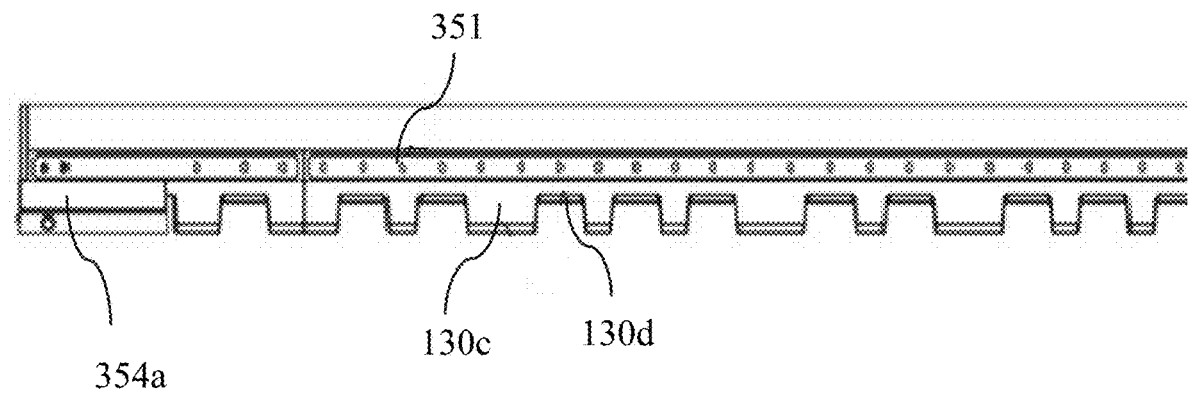
FIG. 3F is a diagram illustrating configuration of exemplary sensors according to some embodiments of the present disclosure.

FIG. 3F is a diagram illustrating configuration of exemplary sensors 130c and 130d according to some embodiments of the present disclosure. Sensors 130c and 130d may be the same as sensor 130 of FIG. 1. In some embodiments, each of sensors 130a and 130b may use the same mechanism for generating sensor data as illustrated in FIGS. 3A-3B.

As shown in FIG. 3F, sensors 130c and 130d may be positioned differently. The sensor 130c may be positioned closer to the keyboard than the sensor 130d. Thus, signals obtained by two sensors may have different baseline values. In some embodiments, the different baseline values may be set between the white keys and the black keys. Thus, the smart musical system 100 may distinguish the white and the black keys. In some embodiments, the different baseline values may be used to distinguish several groups of keys. Merely by way of example, the baseline value of a combination of keys may be different if the combination of keys is designed to perform certain system functions.

In a preferred embodiment, as shown in FIG. 3F, sensors 130c and 130d may be installed on a test lever 354a. The test lever 354a may also be equipped with a LED array 351. The LED array 351 may be used to indicate the key to be depressed. In some embodiments, a player may then depress the corresponding key. In some embodiments, the LED may be double-colored. The double-colored LED array 351 may be served as key indicators. The double-colored LED array 351 may be configured to distinguish black keys and white keys.

Figure 3G:
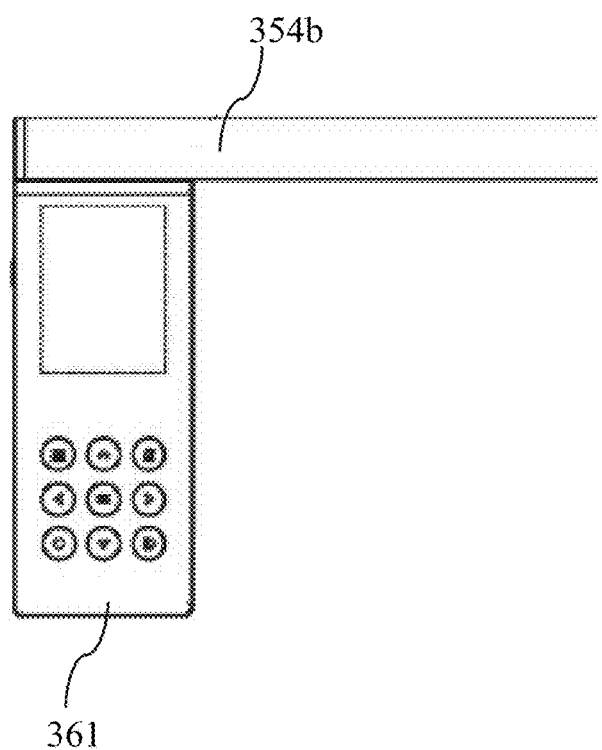
FIG. 3G is a diagram illustrating configuration of an exemplary test lever and an exemplary interface according to some embodiments of the present disclosure.

FIG. 3G is a diagram illustrating configuration of an exemplary test lever and an exemplary interface according to some embodiments of the present disclosure. As shown in FIG. 3G, the test lever 354b may be coupled to an interface 361. The test lever 354b may be the same as the test lever 354a of FIG. 3G. One end of the test lever 354b may be attached to the interface 361. The interface 361 may be capable of performing multiple tasks. In some embodiments, the interface 361 may acquire settings from the player. In some embodiments, the interface 361 may acquire musical data via I/O component or any suitable storage device. In some embodiments, the interface 361 may display instructions generated by the automatic performance system 105.

Figure 4:
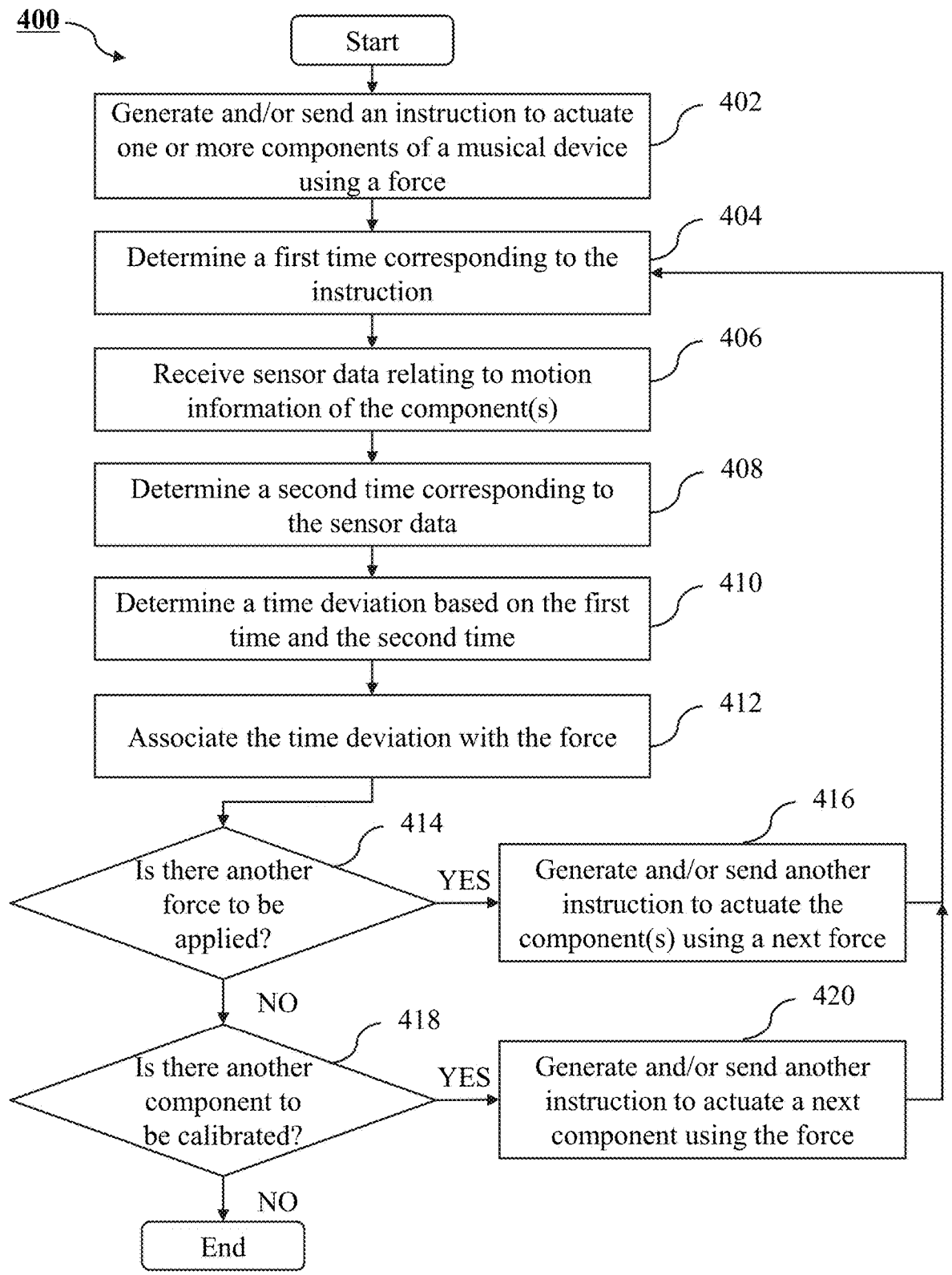
FIG. 4 is a flowchart illustrating an exemplary process for calibrating a musical device according to some embodiments of the present disclosure.

FIG. 4 is a flowchart illustrating an exemplary process 400 for calibrating a musical device according to some embodiments of the present disclosure. Process 400 may be performed by one or more processing devices (e.g., one or more processing devices 120 of FIG. 1).

As illustrated in FIG. 4, in step 402, a processing device may generate and/or send an instruction to actuate one or more components of a musical device using a force. The instruction may include identifying information related to the component(s) (e.g., an index of the component(s)), one or more operation sequences of the component(s), driving devices corresponding to the component(s), endurances, forces applied to the component(s), or the like, or any combination thereof.

The component(s) may include, for example, one or more keys of a piano (e.g., an individual key, a group of keys, etc.), driving devices, etc. In some embodiments, multiple components of the musical device may be divided into one or more groups for calibration. For example, the keys of a piano may be divided into one or more groups based on lengths of piano actions corresponding to the keys. In some embodiments, the processing device can select the component(s) of the musical instrument for calibration in any suitable manner. For example, the processing device can select the component(s) based on one or more user inputs (e.g., a user selection of one or more components of the music instrument). As another example, the processing device can select the component(s) randomly (e.g., by selecting a random component of the musical instrument, a random group of components of the musical instruments, etc.). As still another example, the processing device can select the component(s) of the musical instrument based on positioning information of the components of the musical instrument (e.g., the leftmost component and/or group of components of the musical instrument, the rightmost component and/or group of components of the musical instrument, a component and/or group of components in any other position, etc.).

In some embodiments, the processing device may determine an amount of the force. For example, the amount of the force may be determined based on an intensity level corresponding to the force. The amount of the force and/or the intensity level may be determined based on a MIDI file, a user input, or the like, or a combination thereof.

In step 404, the processing device may determine a first time corresponding to the instruction. The first time may represent a desired time of actuation of the component(s) and/or one or more driving devices corresponding to the component(s). In some embodiments, the processing device may determine a time instant corresponding to generation and/or a time instant corresponding to transmission of the instruction as the first time. For example, the processing device may send an instruction to the driving device 140 at a particular time instant. The particular time instant may be determined as the first time.

In step 406, the processing device may receive sensor data relating to motion information of the corresponding component(s). The sensor data may be acquired by one or more sensors configured to detect motion information of the corresponding component(s) and/or any other information about the component(s) (e.g., one or more sensors 130 of FIG. 1). The sensor data may include any information about motions of the component(s) in response to actuation of the component(s) using the force. For example, the sensor data may include motion information of the component(s) (e.g., one or more positions, an indication that the component(s) are pressed, actuated, and/or released, etc.) and corresponding timing information (e.g., time instants, time intervals, etc. corresponding to the positions). As another example, the sensor data may include information related to whether the component has reached a particular position (e.g., whether a key has been pressed). In some embodiments, the processing device may receive sensor data corresponding to multiple intensity levels of forces applied to the component(s).

The sensor data can include any suitable data that can be used to indicate depression of the component(s), such as a Boolean value (e.g., "True," "False," etc.), a binary value (e.g., "0," "1," etc.), one or more numbers, one or more portions of sensor data (e.g., sensor data 320 of FIG. 3D), and/or any other suitable data. For example, a first value of the sensor data (e.g., "0") relating to a key may indicate that the key is released. As another example, a second value of the sensor data (e.g., "1") relating to the key may indicate that the key is pressed.

In step 408, the processing device may determine a second time corresponding to the instruction. The second time may represent a time of an operation of the component(s) and/or driving device(s) corresponding to the component(s). The second time may be determined based on the received sensor data. In some embodiments, the processing device may determine a time instant corresponding to an operation of the component(s) as the second time. For example, the processing device may determine a time instant corresponding to depression of a key as the second time instant. More particularly, for example, the processing device may determine the time instant by determining a value of the sensor data that is greater than a reference value corresponding to depression of the component(s), a particular value of the sensor data indicative of depression of the component(s) (e.g., "0," "1," etc.), etc.

In step 410, the processing device may determine a time deviation based on the first time and the second time. The time deviation may represent a difference between the first time and the second time, such as an absolute difference between the first time and the second time. The value of the time deviation may include any suitable value, such as a positive value, a negative value, an absolute value, an index value, a log value, or the like, or any combination thereof.

In some embodiments, the positive value may represent that the actual time of actuation of the component(s) is later than the desired time of actuation of the component(s).

In some embodiments, the time deviation may be determined in an iterative manner. For example, the processing device may perform steps 406-410 iteratively to obtain multiple values of the time deviation (e.g., a first time deviation, a second time deviation, etc.). The processing device can then determine the time deviation based on the multiple values (e.g., by determining an average of the multiple values, a weighted sum of the multiple values, etc.).

In step 412, the processing device may associate the time deviation with the force and/or the component(s). For example, information related to the time deviation may be stored in association with information related to the force and/or information related to the component(s) of the musical instrument in any suitable manner. The information related to the component(s) may include, for example, identifying information of the components (e.g., an index of the components, an identification of the components, etc.), identifying information of a group of components related to the component(s) (e.g., an index of the group of components, etc.), or the like, or any combination thereof. In some embodiments, the index of the components may be continuous, interval, and/or determined by a user. For example, the index of a piano may include No. 1, No. 2, No. 3, . . . , No. 88 representing the 88 keys from left to right respectively. As another example, the index of a piano may include No. 1, No. 2, No. 3, . . . , No. 52 representing the 52 white keys from left to right respectively. As a further example, the index of a piano may include No. 1, No. 2, No. 3, . . . , No. 36 representing the 36 black keys from left to right respectively. The information related to the force may include an intensity level of the force (e.g., level 1, level 2, etc.), an amount of force corresponding to the intensity level (5 newtons, 10 newtons, etc.), etc. In some embodiments, the information related to the time deviation may be stored in any suitable data structure. For example, the data structure may include one or more tables, diagrams, and/or any other data structure that may be used to map the time deviation to the force.

In some embodiments, the processing device may update known mapping information related to the time deviation based on the acquired sensor data, etc. For example, the processing device may update a lookup table including the mapping information. The lookup table may be a table including a relationship between various parameters and forces. In some embodiments, the lookup table may include an object-relational mapping, a one-to-one match relationship, a functional relationship (linear or non-linear), or the like, or a combination thereof. For example, the lookup table may be and/or include a first lookup table (e.g., Table 1 as illustrated below) including a relationship between intensity levels of the force applied to a component and/or a component group and the time deviations. As another example, the lookup table may be and/or include a second lookup table (e.g., Table 2 as illustrated below) including a relationship between intensity level groups of the force applied to a component and/or a component group and the time deviations. In some embodiments, the smart musical system 100 may store the lookup table(s) in any suitable storage device.

In some embodiments, the intensity levels of forces may include a certain number of levels. For example, the intensity levels may be 128 levels including level 0, level 1, . . . , and level 127. As another example, the intensity levels may be classified as 10 level groups including level group 0, level group 1, . . . , and level group 9. In some embodiments, the level group may be determined based on user input, MIDI files, empirical results, and/or any other information (e.g., the level group 0 including the level 0, the level 1, . . . and the level 19, the level group 1 including the level 20, the level 21, . . . and the level 39).

In some embodiments, the time deviations may correspond to the intensity levels and/or the intensity level groups of the forces respectively. Correspondingly the time deviations may be expressed as $\{T_0, T_1, \ldots, T_N\}$, where N is a positive integer. For example, the time deviation (e.g., $T_0$, $T_1$, etc.) may include a period of time corresponding to the time deviation (e.g., 100 milliseconds, 50 milliseconds, etc.). As another example, the minimum value of the intensity levels and/or the intensity level groups may correspond to the maximum time deviation. As a further example, the maximum value of the intensity levels and/or the intensity level groups may correspond to the minimum time deviation. In some embodiments, in the first lookup table, the intensity levels may correspond to the time deviations respectively. For example, as illustrated in Table 1, each of intensity levels 0-127 corresponds to one of the time deviations. As another example, as illustrated in Table 2, each of intensity level groups 0-9 corresponds to one of the time deviations.

In some embodiments, the processing device may analyze and/or process the intensity levels (and/or intensity level groups) of the force applied to the component and/or the component group, and update the relationship between the intensity levels (and/or intensity level groups) and the time deviations.

TABLE 1 an example of relationships between intensity levels and time deviations

| Intensity level | Value of the intensity level | Time deviation |
|---|---|---|
| Level 0 | 1N | $T_0$ |
| Level 1 | 5N | $T_1$ |
| . . . | | . . . |
| Level 127 | 70N | $T_{127}$ |

As used herein, unit "N" in table 1 refers to newton (also referred to as kg·m/s$^2$).

TABLE 2 an example of relationships between intensity level groups and time deviations

| Intensity level group | Value of the intensity level group | Time deviation |
|---|---|---|
| Level group 0 | 1N | $T_0$ |
| Level group 1 | 10N | $T_1$ |
| . . . | | . . . |
| Level group 9 | 70N | $T_9$ |

As used herein, unit "N" in Table 2 refers to newton (also referred to as kg·m/s$^2$).

In step 414, the processing device may determine whether there is another force to be applied. For example, in response to determining that all forces to be applied for calibration have been applied to the component(s), the processing device may determine that there is not another force to be applied. In some embodiments, in response to determining that there is another force to be applied to the component(s), the processing device may proceed to step 416 and may generate and/or send another instruction to actuate the component(s) using a next force. The next force can be, for example, a force corresponding to another intensity level.

In some embodiments, in response to determining that no force is to be applied, the processing device may proceed to step 418 and may determine whether there is another component to be calibrated. For example, the processing device can determine whether all of the components and/or groups of components of the musical device to be calibrated have been calibrated.

In some embodiments, in response to determining that there is one or more other components to be calibrated, the processing device 120 may proceed to step 420 and may generate and/or send another instruction to actuate a next component and/or group of components using the force. For example, after a first component calibrated, the processing device may loop back to 404 and may associate another time deviation with the force and/or a second component of the musical instrument.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, process 400 may include one or more other optional steps, for example, a caching step, a storing step, or the like. In some embodiments, process 400 can be executed iteratively to associate the time deviation with the force corresponding to one or more components of the musical device (e.g., to apply multiple forces, to calibrate multiple components of the musical system, etc.).

Figure 5:
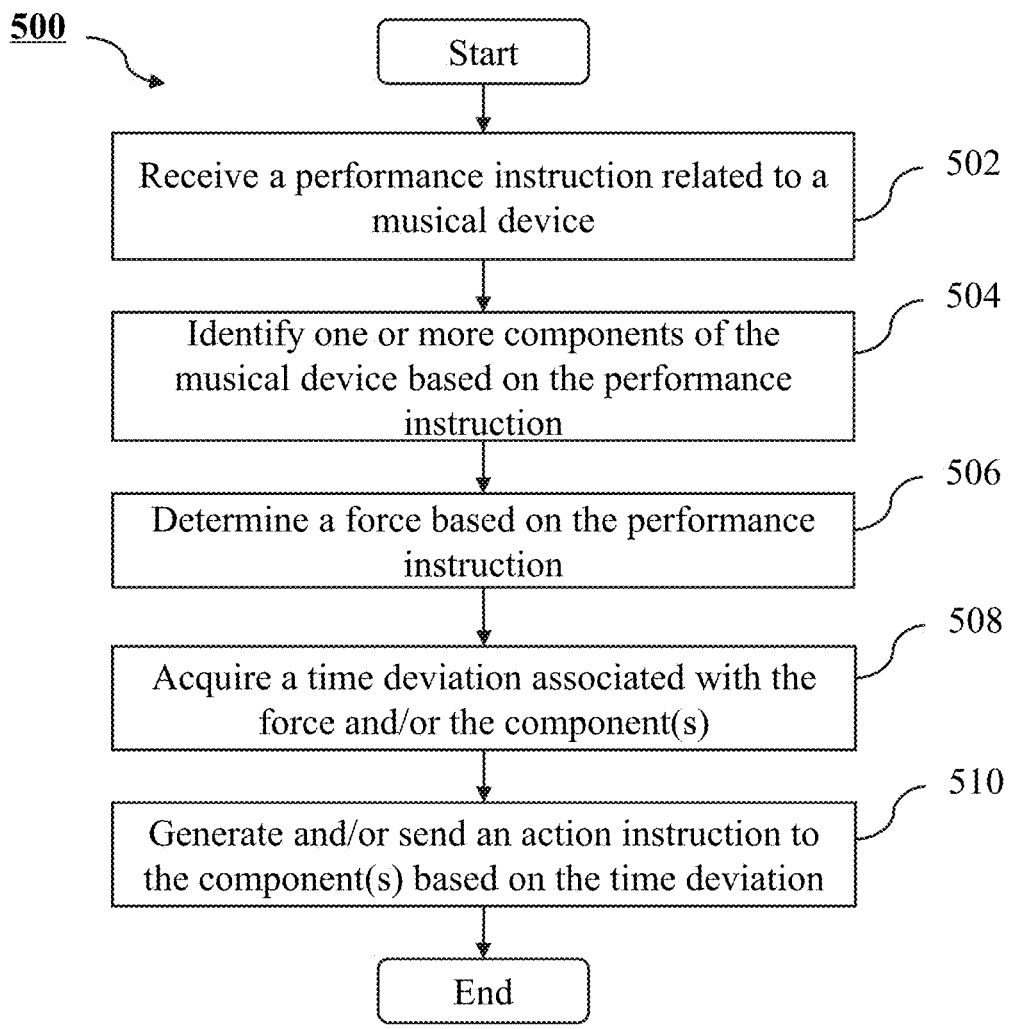
FIG. 5 is a flowchart illustrating an exemplary process for performing a musical device according to some embodiments of the present disclosure.

FIG. 5 is a flowchart illustrating an exemplary process 500 for performing music using a musical device according to some embodiments of the present disclosure. Process 500 may be performed by one or more processing devices (e.g., one or more processing devices 120 of FIG. 1). In some embodiments, one or more portions of process 500 may be executed to performing one or more components of the musical system, such as one or more keys and/or pedals of a piano.

As illustrated FIG. 5, in step 502, the processing device may receive a performance instruction related to a musical device. The performance instruction may be and/or include an instruction that instructs the musical device to perform music. The music may be and/or include a piano piece, and/or any other piece that can be performed by a keyboard musical instrument. The performance instruction may include any information about the music (also referred to herein as the "music data"), such as one or more musical sheets, musical scores, annotations, musical notes, dynamics (e.g., "p," "f," "mp," "mf," "pp," "ff," etc.), note duration, note values, a title of the music, operation sequences of keys and/or pedals, a strength to be applied to one or more keys and/or pedals, endurance of and/or any other information about the music.

In some embodiments, the performance instruction may instruct one or more components (e.g., one or more keys of a piano) to perform the music. The performance instruction may include identifying information related to the component(s) (e.g., an index of the component(s)), one or more operation sequences of the component(s), one or more driving devices corresponding to the component(s), and one or more intensity levels of forces and/or any other information. The performance instruction may also include information about force(s) to be used to cause the component(s)

to perform the music, such as an amount of a force, one or more intensity levels of the force(s), etc. In some embodiments, the performance instruction may be received in the form of one or more MIDI files, user's input, or the like, or a combination thereof.

In some embodiments, in step 504, the processing device may identify one or more components of the musical device based on the performance instruction. For example, the component(s) may be identified based on the music data related to the performance instruction. More particular, for example, the processing device can extract musical data from the performance instruction and can identify one or more musical notes to be played based on the musical data. The processing device can then identify one or more components of the musical device that can play the musical notes (e.g., one or more keys of a piano, driving devices corresponding to the keys, etc.). As another example, the processing device can extract identifying information related to the component(s) from the performance instruction and can then identify the component(s) based on the identifying information.

The component(s) of the musical device may be actuated by the driving device respectively. For example, a first driving device may correspond to a first key and/or a first key group of a piano. The processing device may reset the component to a default position while the driving device corresponding to the component applied with a particular force. In some embodiments, the default position may represent a position of the component(s) when no force is applied to component(s) (e.g., when a key of a piano is not pressed).

In step 506, the processing device may determine a force corresponding to the performance instruction. For example, the processing device can extract musical data from the performance instruction and can determine the force based on the musical data (e.g., dynamics, a music score, a music sheet, and/or any other information that can be used to determine loudness of one or more musical notes to be played). As another example, the processing device can extract information about force(s) to be used to cause the component(s) to perform the music and determine the force based on the extracted information. The force may correspond to one or more intensity levels. In some embodiments, the intensity levels may be the same as or different from those included in a lookup table. For example, the intensity levels may be standard as shown in Table 1 and/or Table 2. In some embodiments, the processing device may compare the force to the value of the intensity levels in the lookup table. For example, the force is 5 newtons and the processing device may determine the intensity level of the force is level 0 as shown in Table 1. In some embodiments, the processing device may determine values of one or more other intensity levels and update the lookup table based on the determined values.

In step 508, the processing device may acquire a time deviation associated with the force and/or the component(s). The time deviation may represent a difference between the desired time of actuation of the component and the actual time of actuation of the driving device. The time deviation may be acquired in any suitable manner. For example, the processing device can access data storage storing associations of time deviations, forces, and components. The processing device can then retrieve a time deviation that has been stored in association with information related to the force. More particularly, for example, the intensity level of the force is level 0, and the processing device may acquire the time deviation $T_0$ as shown in table 1.

As another example, the processing device can determine the time deviation based on one or more other time deviations associated with other forces. In some embodiments, the processing device may acquire the time deviation according to the time duration that the driving device has been used. For example, the time deviation may be determined by executing one or more portions of process 600 as described in connection with FIG. 6 below.

In some embodiments, the time deviation may be acquired by estimating one or more values based on associations between known intensity levels and known time deviations (e.g., as illustrated in Table 1, and/or Table 2). The estimation may be made using one or more interpolation methods, such as one or more of a linear interpolation method, a polynomial interpolation method, a spline interpolation method, etc. For example, the processing device may determine a particular value of the force and a time deviation relating to the particular value of the force based on the lookup table using an interpolation method. As another example, the processing device may further update the lookup table based on the determined particular value of the force and the time deviation accordingly.

As still another example, the processing device can send, to another device, a request for the time deviation. The processing device can then acquire the time deviation by receiving one or more responses to the request and extracting the time deviation from the responses.

In step 510, the processing device may generate and/or send an action instruction to the component(s) of the musical device based on the time deviation. The action instruction may be and/or include an instruction that instructs the component(s) of the musical device to perform desirable music. The desirable music may be and/or include the music with a desired time to be performed. The action instruction may include any information about actuation of the component(s), such as a driving device corresponding to one or more keys and/or pedals to strike the key(s) and/or pedal(s), operation sequences of keys and/or pedals, a strength to be applied to one or more keys and/or pedals, and/or any other information about the actuation.

In some embodiments, the action instruction may instruct the component(s) to actuate with the desired time of actuation of the component(s) and/or one or more driving devices corresponding to the component(s). The action instruction may include may include information about the force(s) to be used to cause the component(s) to perform desirable music, such as the amount of the force, the intensity level(s) of the force(s) corresponding to the driving device, etc. The action instruction may also include timing information about the motion state of the component(s), such as time to actuate the driving device, and/or any other information. For example, if the time deviation is a positive value, the processing device may send the action instruction with the time deviation earlier. As another example, the processing device may send the action instruction with the time deviation later.

It should be noted that the above description is merely provided for the purposes of illustration, and not intended to limit the scope of the present disclosure. For persons having ordinary skills in the art, multiple variations and modifications may be made under the teachings of the present disclosure. For example, the performance instruction may include information relating the driving device corresponding to the component(s), and step 502 may proceed to step 506. As another example, the performance instruction may include an intensity level of a force, and step 502 may proceed to step 508. In some embodiments, the processing device may perform the components of the musical device respectively with process 500.

Figure 6:
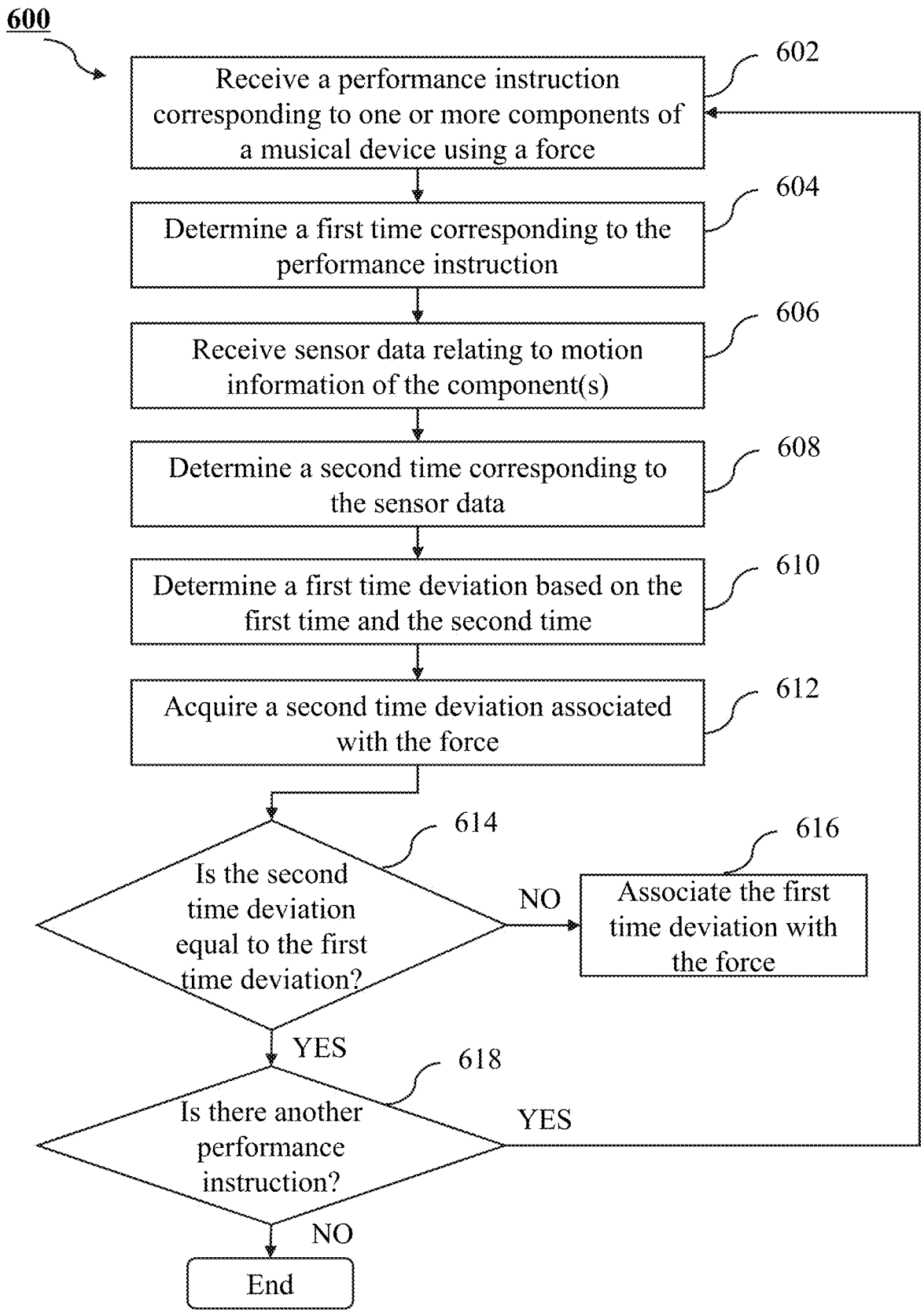
FIG. 6 is a flowchart illustrating an exemplary process for updating calibration information of a musical device according to some embodiments of the present disclosure.

FIG. 6 is a flowchart illustrating an exemplary process 600 for updating calibration information of a musical device according to some embodiments of the present disclosure. Process 600 may be performed by one or more computing devices implementing one or more processing devices (e.g., one or more processing devices 120 of FIG. 1). In some embodiments, the processing device may determine whether to update a time deviation associated with a force corresponding to component(s) of a musical device based on any suitable criterion and/or criteria. For example, the processing device may determine that an update is to be performed in response to determining that the time interval between a time instant corresponding to a previous calibration of the musical instrument (e.g., the most recent calibration) and a current time exceeds a certain threshold (e.g., 1 month, 1 season, 1 year, a period of time defined by a user, etc.). As another example, the processing device may determine that an update is to be performed in response to determining that the musical device has been played for a certain number of times (e.g., 50 times). As a further example, the processing device may perform an update according to an instruction from a user, a MIDI file and/or a factory setting.

As illustrated in FIG. 6, in step 602, the processing device may receive a performance instruction corresponding to one or more components of a musical device using a force. In some embodiments, the processing device may determine the force based on the performance instruction. For example, the performance instruction may include one or more intensity levels of the force. In some embodiments, the processing device may receive the intensity level of the force from the performance instruction. In some embodiments, the processing device may identify a driving device corresponding to the component(s). For example, the processing device may identify a first driving device relating to a first component, and determine that the intensity levels of the force is level 2 (as illustrated in table 1) based on the performance instruction. In some embodiments, the processing device may actuate the driving device with the force. For example, the first driving device may be actuated with level 2 of the force.

In step 604, the processing device may determine a first time corresponding to the performance instruction. The determination may be the same as disclosed in step 404. In some embodiments, the first time may represent a time instant to actuate the driving device. In step 606, the processing device may receive sensor data relating to motion information of the component(s). The sensor data may be a current signal, a voltage signal, or the like, or a combination. The motion information may include a motion state of the component (e.g., a position of a key/pedal, a velocity of a key/pedal, an acceleration of a key/pedal). In some embodiments, values of the sensor data may represent the component being pressed and/or released. For example, the value of the sensor data greater than a reference value may represent the depression of the key. Steps 606, 608, and 610 may be performed in substantially the same manner as steps 406, 408, and 410. In step 612, the processing device may acquire a second time deviation associated with the force. The acquisition method of the second time deviation may be disclosed in step 508.

In step 614, the processing device may determine whether the second time deviation is equal to the first time deviation. For example, the processing device may determine the second time deviation not equal to the first time deviation, while the first time deviation is 50 milliseconds in step 610 and the second time deviation associated with the force is $T_0$ (e.g. 100 milliseconds) in step 612. In some embodiments, in response to determining that the second time deviation is not equal to the first time deviation, the processing device may proceed to step 616 and may associate the first time deviation with the force.

In some embodiments, in response to determining that the second time deviation is equal to the first time deviation, the processing device may proceed to step 618 and may determine whether there is another performance instruction. For example, after a first component updated, the processing device may further proceed process 600 to update another time deviation with the force of a second component.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, process 600 can be executed iteratively to update the time deviation with the force corresponding to one or more components of the musical device (e.g., to apply multiple forces, to calibrate multiple components of the musical system, etc.).

Figure 7:
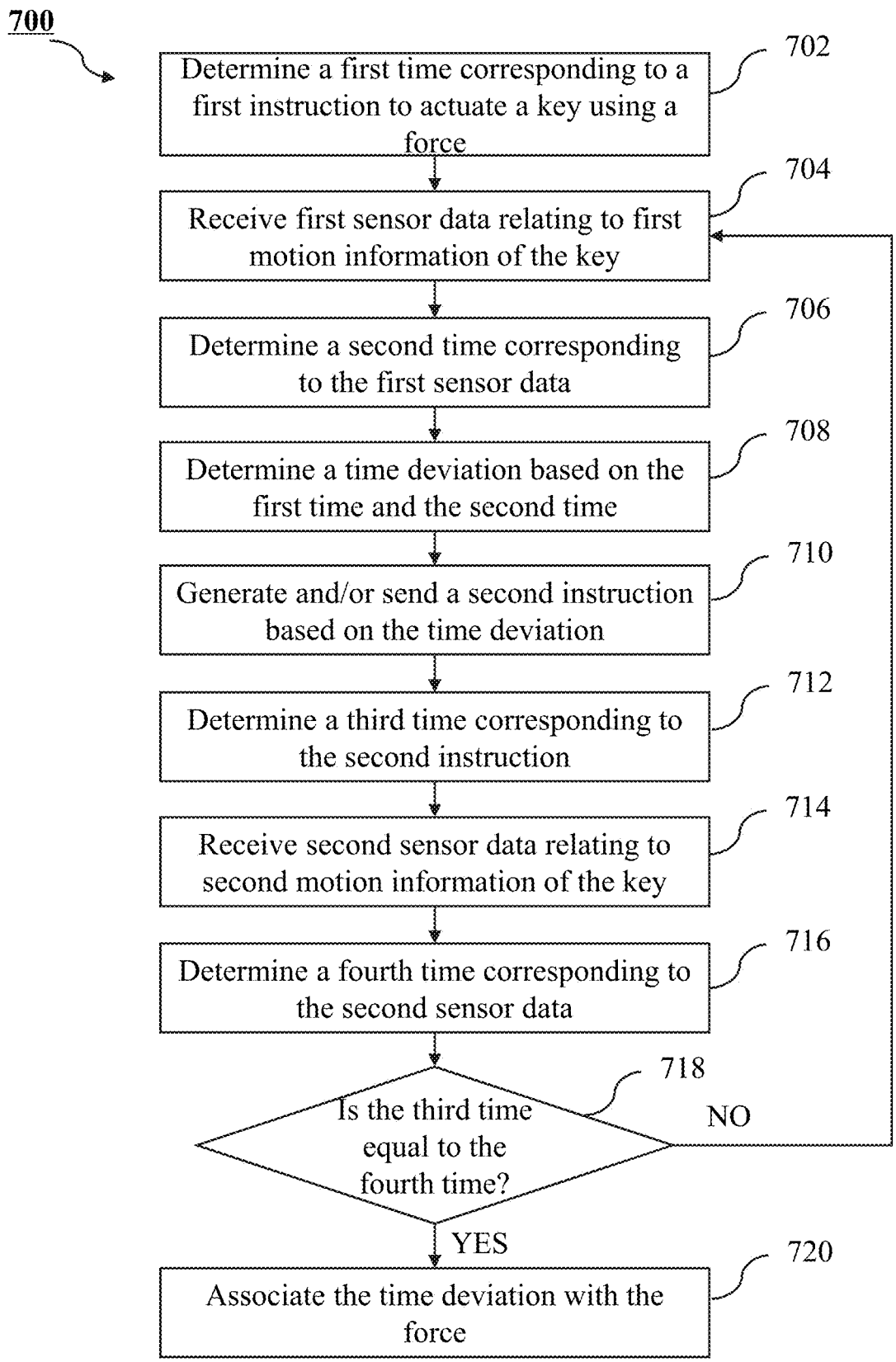
FIG. 7 is a flowchart illustrating an exemplary process for identifying whether the time deviation associated with the force is suitable according to some embodiments of the present disclosure.

FIG. 7 is a flowchart illustrating an exemplary process 700 for identifying whether the time deviation associated with the force is suitable according to some embodiments of the present disclosure. Process 700 may be performed by one or more computing devices implementing one or more processing devices (e.g., one or more processing devices 120 of FIG. 1).

In step 702, the processing device may determine a first time corresponding to a first instruction to actuate a key of a piano using a force. The first instruction may include an operation sequence of keys, an endurance, a strength of a force applied to a key, or the like, or a combination thereof. In some embodiments, the first instruction may be generated and/or sent based on a MIDI file, a user's input, an instruction from a device (e.g., the processing device 120, the sensor 130, the driving device 140), or the like, or a combination thereof. The determination method of the first time may be the same as step 404. Steps 704, 706, and 708 may be performed in substantially the same manner as steps 406, 408, and 410.

In step 710, the processing device may generate and/or send a second instruction based on the time deviation. The second instruction may include the intensity level of the force, time to actuate a driving device, and/or any other information. The time to actuate the driving device may include the first time, the time deviation, or the like, or any combination thereof. In some embodiments, the driving device may correspond to one or more keys. The method of generating and/or sending the second instruction may be the same as disclosed in step 510. For example, the processing device may send the second instruction with the time deviation ahead of the first time, and the driving device may be actuated with the time deviation earlier than the first instruction.

In some embodiments, in step 712, the processing device may determine a third time corresponding to the second instruction. In some embodiments, the third time may include the first time, the time deviation, or the like, or any combination thereof. For example, the third time may represent time to actuate the driving device. The determination method of the third time may be the same as step 404. In step 714, the processing device may receive second sensor data relating to second motion information of the key being pressed. The method of receiving the second sensor data may be the same as step 406. For example, the second sensor data may include whether the key has reached a particular position (e.g., whether the key has been pressed). In step 716, the processing device may determine a fourth time corresponding to the second sensor data. For example, the time that the key has been pressed down may be the fourth time. As another example, the time receiving the second sensor data may be determined as the fourth time. The determination method of the fourth time may be disclosed as step 408.

In step 718, the processing device may determine whether the third time is equal to the fourth time. In some embodiments, the processing device may compare the third time and the fourth time and determine a difference between the third time and the fourth. For example, the difference between the third time and the fourth may be not greater than a threshold, and the processing device may determine that the third time is equal to the fourth time. The equation of the third time and the fourth time may represent that the time deviation has been eliminated and/or reduced. For example, the difference between the third time and the fourth time may be 5 percent of the time deviation. In some embodiments, the driving device relating to the key may be actuated corresponding to the first instruction at the same time. For example, the third time may represent a total time of the first time and the time deviation, and the fourth time may represent a time that the processing device receiving the second sensor data.

In some embodiments, in response to determining that the third time is equal to the fourth time (e.g., "YES" at step 718), the processing device may proceed to step 720 and may associate the time deviation with the force. The method of associating the time deviation with the force may be disclosed as step 412.

In some embodiments, in response to determining that the third time is not equal to the fourth time (e.g. "NO" at step 718), the processing device may loop back to step 704 and may proceed one or more portions of process 700.

It should be noted that the above steps of the flow diagrams of FIGS. 4-7 can be executed or performed in any order or sequence not limited to the order and sequence shown and described in the figures. Also, some of the above steps of the flow diagrams of FIGS. 4-7 can be executed or performed substantially simultaneously where appropriate or in parallel to reduce latency and processing times. Furthermore, it should be noted that FIGS. 4-7 are provided as examples only. At least some of the steps shown in these figures can be performed in a different order than represented, performed concurrently, or altogether omitted.

In some implementations, any suitable machine-readable storage media can be used for storing instructions for performing the functions and/or processes described herein. For example, in some implementations, storage media can be transitory or non-transitory. For example, non-transitory storage media can include media such as magnetic media (such as hard disks, floppy disks, etc.), optical media (such as compact discs, digital video discs, Blu-ray discs, etc.), semiconductor media (such as flash memory, electrically programmable read-only memory (EPROM), electrically erasable programmable read-only memory (EEPROM), etc.), any suitable media that is not fleeting or devoid of any semblance of permanence during transmission, and/or any suitable tangible media. As another example, transitory storage media can include signals on networks, in wires, conductors, optical fibers, circuits, any suitable media that is fleeting and devoid of any semblance of permanence during transmission, and/or any suitable intangible media.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "acquiring," "generating," "calculating," "executing," "storing," "producing," "determining," "obtaining," "calibrating," "recording," "comparing," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," etc. as used herein are meant as labels to distinguish among different elements and may not necessarily have an ordinal meaning according to their numerical designation.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the present disclosure are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method implemented on a digital instrument having at least one processor and at least one computer-readable storage medium, comprising:
    determining a first time corresponding to a first instruction that instructs a driving device to actuate a first component of a musical device using a first force;
    receiving first sensor data relating to motion information of the first component;
    determining a second time based on the first sensor data;
    determining, by a hardware processor, a first time deviation based on the first time and the second time;
    identifying a second force to be applied to the first component of the musical device;
    sending a second instruction to actuate the first component of the musical device using the second force;

determining a second time deviation based on the second instruction; and calibrating the musical device based on the first time deviation and the second time deviation.

2. The method of claim 1, wherein calibrating the musical device based on the first time deviation comprises associating the first time deviation with the first force and the first component.

3. The method of claim 1, wherein determining the first time deviation based on the first time and the second time comprises determining a difference between the first time and the second time.

4. The method of claim 1, wherein determining the first time deviation based on the first time and the second time further comprises updating mapping information related to a plurality of intensity levels and a plurality of time deviations.

5. The method of claim 1, wherein the second time comprises a time instant corresponding to an operation of the first component of the musical device.

6. The method of claim 2, further comprising:

receiving a performance instruction corresponding to the musical device;

identifying the first component based on the performance instruction;

determining the first force corresponding to the first component based on the performance instruction;

acquiring the first time deviation associated with the first force; and generating an action instruction to the first component based on the first time deviation.

7. The method of claim 1, further comprising:

identifying a second component of the musical device to be calibrated;

sending a third instruction to actuate the second component of the musical device using the first force;

determining a third time deviation based on the third instruction; and calibrating the musical device based on the third time deviation.

8. The method of claim 1, wherein the first sensor data is generated by a sensor that is configured to detect motion information related to the first component of the musical device.

9. A system, comprising:

at least one processing device to:

determine a first time corresponding to a first instruction that instructs a driving device to actuate a first component of a musical device using a first force;

receive first sensor data relating to motion information of the first component;

determine a second time based on the first sensor data;

determine a first time deviation based on the first time and the second time;

identify a second force to be applied to the first component of the musical device;

send a second instruction to actuate the first component of the musical device using the second force;

determine a second time deviation based on the second instruction;

and calibrate the musical device based on the first time deviation and the second time deviation.

10. The system of claim 9, wherein to calibrate the musical device based on the first time deviation, the processing device is further to associate the first time deviation with the first force and the first component.

11. The system of claim 9, wherein to determine the first time deviation based on the first time and the second time, the processing device is further to determine a difference between the first time and the second time.

12. The system of claim 9, wherein to determine the first time deviation based on the first time and the second time, the processing device is further to update mapping information related to a plurality of intensity levels and a plurality of time deviations.

13. The system of claim 9, wherein the second time comprises a time instant corresponding to an operation of the first component of the musical device.

14. The system of claim 10, wherein the processing device is further to:

receive a performance instruction corresponding to the musical device;

identify the first component based on the performance instruction;

determine the first force corresponding to the first component based on the performance instruction;

acquire the first time deviation associated with the first force; and generate an action instruction to the first component based on the first time deviation.

15. The system of claim 9, wherein the processing device is further to:

identify a second component of the musical device to be calibrated;

send a third instruction to actuate the second component of the musical device using the first force;

determine a third time deviation based on the third instruction; and calibrate the musical device based on the third time deviation.

16. The system of claim 9, wherein the first sensor data is generated by a sensor that is configured to detect motion information related to the first component of the musical device.

17. The system of claim 16, wherein the sensor comprises at least one of an optoelectronic sensor, a conductive rubber sensor, a conductive silicone rubber sensor, an accelerometer, a magneto-electric sensor, a piezo-electric sensor, or an angle sensor.

18. A non-transitory machine-readable storage medium including instructions that, when accessed by a processing device, cause the processing device to:

determine a first time corresponding to a first instruction that instructs a driving device to actuate a first component of a musical device using a first force;

receive first sensor data relating to motion information of the first component;

determine a second time based on the first sensor data;

determine a first time deviation based on the first time and the second time;

identify a second force to be applied to the first component of the musical device;

send a second instruction to actuate the first component of the musical device using the second force;

determine a second time deviation based on the second instruction;

and calibrate the musical device based on the first time deviation and the second time deviation.

* * * * *